(12) United States Patent
Giffin

(10) Patent No.: US 12,151,396 B2
(45) Date of Patent: Nov. 26, 2024

(54) TOOL FOR A POTTER'S WHEEL

(71) Applicant: Giffin Tec, Inc., Lummi Island, WA (US)

(72) Inventor: Brian Kenneth Giffin, Lummi Island, WA (US)

(73) Assignee: Giffin Tec, Inc., Lummi Island, WA (US)

( * ) Notice: Subject to any disclaimer, the term of this patent is extended or adjusted under 35 U.S.C. 154(b) by 0 days.

(21) Appl. No.: 18/103,109

(22) Filed: Jan. 30, 2023

(65) Prior Publication Data

US 2023/0241802 A1    Aug. 3, 2023

Related U.S. Application Data

(60) Provisional application No. 63/304,646, filed on Jan. 30, 2022.

(51) Int. Cl.
*B28B 1/20* (2006.01)
*B28B 1/02* (2006.01)

(52) U.S. Cl.
CPC .............. *B28B 1/20* (2013.01); *B28B 1/025* (2013.01)

(58) Field of Classification Search
CPC ....... B28B 1/025; B28B 7/0079; B28B 7/243; B28B 7/263; B28B 1/20; B28B 17/00; B23B 31/16004; B23B 31/00; B23B 31/02; B23B 31/021; B23B 31/028; B23B 31/103; B23B 31/107; B23B 31/117; B23B 31/16; B23B 31/16041; F16B 2005/0671; F16B 5/0657; F16B 2/04

USPC ......... 425/47, 262, 263, 265, 266, 268, 459, 425/DIG. 120, 182, 185, 186, 188, 193, 425/195

See application file for complete search history.

(56) References Cited

U.S. PATENT DOCUMENTS

| | | | |
|---|---|---|---|
| 3,520,036 A | 7/1970 | Maloney | |
| 3,891,171 A * | 6/1975 | Samuelian | B01F 29/83 248/349.1 |
| 4,057,384 A | 11/1977 | Reid | |

(Continued)

FOREIGN PATENT DOCUMENTS

| | | | | |
|---|---|---|---|---|
| DE | 3527576 A * | 2/1987 | ............ | B28B 1/02 |
| WO | WO-2020064115 A1 * | 4/2020 | ....... | B23B 31/16012 |
| WO | WO-2022025356 A1 * | 2/2022 | | |

OTHER PUBLICATIONS

English translation WO-2022025356-A1 (Year: 2022).*

(Continued)

*Primary Examiner* — Jeffrey M Wollschlager
*Assistant Examiner* — Edgaredmanuel Troche
(74) *Attorney, Agent, or Firm* — Sheridan Ross P.C.

(57) ABSTRACT

An improved tool for use with a potter's wheel is provided, and the tool configured to attach to the spinning potter's wheel and hold a workpiece in the center thereof. The tool comprises an upper plate and a lower plate that are rotatable with respect to each other. A holding arm can extend through an arm slot in the upper plate to engage a spiral ridge of the lower plate. Relative rotation between the upper plate and the lower plate causes the holding arm to move inward or outward in a radial direction to engage a workpiece. The lower plate comprises fish-shaped apertures to engage fasteners on the potter's wheel in a manner to reduce chatter and improve the longevity of the tool.

20 Claims, 17 Drawing Sheets

(56) References Cited

U.S. PATENT DOCUMENTS

| | | | | |
|---|---|---|---|---|
| 4,166,705 | A | * | 9/1979 | Fronske ................ B01F 29/81 |
| | | | | 366/221 |
| 4,222,577 | A | * | 9/1980 | Giffin .................... B28B 1/025 |
| | | | | 279/151 |
| 4,585,240 | A | * | 4/1986 | Giffin .................... B28B 1/025 |
| | | | | 279/151 |
| 4,606,591 | A | * | 8/1986 | Bloch ................ H05K 7/1409 |
| | | | | 439/157 |
| 2012/0216659 | A1 | * | 8/2012 | Bailey .................. B28B 1/025 |
| | | | | 29/559 |
| 2019/0308340 | A1 | * | 10/2019 | Valle ..................... B28B 17/00 |
| 2020/0370266 | A1 | * | 11/2020 | Millman ............... E02D 17/10 |
| 2021/0156507 | A1 | * | 5/2021 | Huang .................. F16M 11/10 |

OTHER PUBLICATIONS

English translation DE-3527576-A (Year: 1987).*
Translation and Patent document merged for WO-2020064115-A1 (Year: 2020).*
NPL1_Complete_Guide_to_Washers_Types_Material_and_Size_Chart_-_WayKen.pdf (Year: 2023).*
Extended Search Report for European Patent Application No. 23153907.3, dated Jun. 19, 2023 8 pages.

* cited by examiner

TOOL FOR A POTTER'S WHEEL

CROSS-REFERENCE TO RELATED APPLICATIONS

This application claims priority under 35 U.S.C. § 119(e) to U.S. Provisional Patent Application Ser. No. 63/304,646 filed Jan. 30, 2022, which is incorporated herein in its entirety by reference.

FIELD

Embodiments of the present disclosure relate to an improved tool that centers and holds pottery and other workpieces on a potter's wheel. More specifically, embodiments of the present disclosure relate to an improved tool for use with a potter's wheel.

BACKGROUND

A potter's wheel is a machine that rotates a workpiece for shaping (also known as "throwing"), molding, trimming, decorating, etc. the workpiece to produce an evenly round shape or decoration as the workpiece rotates. A workpiece, which initially may be a rough clay material, is placed on a spinning wheel of the potter's wheel, and the spinning wheel rotates relative to a base to then rotate the workpiece. As the workpiece is formed, shavings (also called "trimmings") or other removed pieces of the workpiece can land on the spinning wheel. The centripetal force caused by the spinning wheel moves these trimmings away from the spinning wheel and workpiece and into a collection bin or out onto the ground.

The potter's wheel typically requires a feature capable of mounting and holding a workpiece onto the spinning wheel. For instance, clay can be used to mount a workpiece to a spinning wheel. However, this is not a secure attachment and may result in a workpiece becoming dislodged and falling off the spinning wheel. Alternatively, a plate can be mounted to the spinning wheel, and the plate can have specific attachment features to secure the workpiece. However, there is often a loose engagement between apertures in the plate and screw caps of the spinning wheel that causes chatter, which is undesirable for a number of reasons, including reduction in the longevity of the plate and the potter's wheel. Specifically, the apertures that receive the screw caps of the potter's wheel are circular and sized to fit both ¼ inch (6.35 mm) and 10 mm screw caps of different models and manufacturers of potter's wheels. Such variance in the screw cap size leads to chatter when the potter's wheel is spinning.

Accordingly, there is a need for a tool having holding features that secure a workpiece and attachment features to fit various sized potter's wheels and to reduce chatter associated with prior art plates.

SUMMARY

These and other needs are addressed by the various embodiments and configurations of the present disclosure. A novel tool is provided with fish-shaped apertures that engage variably-sized fasteners on a spinning wheel of a potter's wheel to reduce chatter and improve the longevity of the tool and the potter's wheel. Moreover, the tool has multiple holding arms (also called "mounting arms" and "securing arms" and "sliders") to engage, center, and hold a workpiece.

It is one aspect of various embodiments of the present disclosure to provide a tool that secures to a potter's wheel with less chatter. In some embodiments of the present disclosure, the tool has fish-shaped apertures: two for receiving ¼ inch (6.35 mm) screw caps or socket head cap screws and two for receiving 10 mm screw caps. The two ¼ inch (6.35 mm) apertures are positioned opposite one another and about 45 to 90 degrees from the two 10 mm apertures. The tail of the fish-shaped aperture is configured to be press fit over standard sized bat pins such that the tail works like a spring keeping pressure on the bat pin. With two oppositely arranged apertures engaging respective screw caps, the tool is centered and secured to the spinning wheel of the potter's wheel without chatter.

In various embodiments, the apertures are positioned proximate to the perimeter of the tool. In further embodiments, the tool has an additional two or four apertures positioned closer to the center of the tool to accommodate smaller (e.g., mini) potter's wheels. In various embodiments, the fish shape of the aperture allows the user to push the screw cap or socket head cap screw (the two terms can be used interchangeably herein) into the aperture and slide it along the length of the aperture until the screw cap is securely held in the aperture. This accommodates different brands of potter's wheels with different sized screw caps and tolerances. The fish-shaped apertures can also receive and accommodate pins or posts if such are used in the potter's wheel.

It is one aspect of embodiments of the present disclosure to provide fish-shaped apertures on other products that fit onto bat pins. A bat is a plate that fits onto the potter's wheel before throwing. Bats are used to remove the pot or other workpiece after throwing without risk of distortion. Bats have holes that are drilled slightly larger than the typical bat pin size. It is this looseness that creates chatter between the bat and the potter's wheel. Additionally, the holes get looser over time because the chatter causes wear and tear on the holes.

In some embodiments, the tool for the potter's wheel does not use brackets to fasten the tool to the potter's wheel. Instead, bat pins (i.e., socket head cap screws that protrude from the surface of the potter's wheel about 10" on center) are used to fasten the tool to the potter's wheel. Any slop between the bat pin and the tool will cause chatter, and the fish-shaped aperture prevents this chatter because the aperture maintains pressure on the bat pin and forces bat pin into the head (i.e., wedge) of the fish shape.

The fish-shaped apertures work best in a preferred direction (clockwise or counterclockwise) depending on the rotational direction of the potter's wheel, but the fish-shaped apertures are adequate for the ordinary amount of trimming torque in any direction. When trimming in the non-preferred direction there is not a sufficient force against the tail of the fish-shaped aperture to be a problem. However, when used for throwing, the fish-shaped apertures must be oriented in the proper direction such that the direction of rotation is away from the head of the fish-shaped aperture. This is because the amount of torque created while throwing is much more significant than with trimming. Counterclockwise turning is the standard direction except in Japan. However, in some embodiments the fish-shaped apertures are oriented in the other direction or two are oriented in one direction and two are oriented in the opposite direction. Thus, it is one aspect of embodiments of the present disclosure to provide a tool with a plurality of apertures capable of attaching to different fasteners such as pins or screws on a spinning wheel that spins in either a clockwise or counterclockwise direction.

It is one aspect of embodiments of the present disclosure to provide a tool for a potter's wheel that can accommodate inconsistencies in bat pin sizes, maintains the tool on center, and has longevity. In some embodiments, this is accomplished by fish-shaped apertures that receive the bat pins or screw caps. The fish-shape allows the tool to accommodate a greater variety of bat pin sizes. This is necessary because many manufacturers of potter's wheels and the bat pins all have small inconsistencies in size. The head of the fish-shaped aperture creates a wedge that the bat pin is forced into by the flexible tail. When the potter's wheel is in motion, it forces the bat pins further into that wedge shape on both sides. This helps prevent the tool from wearing unevenly, which also keeps the tool true. Over time any slop will cause chatter and increase the wear and tear. By reducing the vibrations that cause chatter, the lifespan of the tool is extended.

It is another aspect of embodiments of the present disclosure to provide a tool for a potter's wheel that has a safety feature that permits the trimming chuck to separate from the wheelhead if clothing or other articles becomes entangled therein.

It is one aspect of embodiments of the disclosure to provide a tool for a potter's wheel having two plates. In some embodiments, the lower plate has one or more fish-shaped apertures capable of attaching the tool to different styles of potter's wheels and an upper plate having holding arms capable of securing a workpiece to the tool and, thus, the potter's wheel. In some embodiments, the lower plate and upper plate are rotatable relative to each other, and the relative rotation between the plates causes an inward or outward radial movement of the holding arms depending on the rotation direction.

It is an aspect of embodiment of the present disclosure to provide a lower plate with spiral ridges that translate the relative rotational movement of the upper and lower plates to inward and outward movement of holding arms in the radial direction. The holding arm has a downwardly-extending protrusion positioned on each side of the spiral ridge, which varies in distance from a center of the lower plates and the tool generally. As the upper and lower plates rotate relative to each other, the spiral ridge located under the arm slot changes distance from the center, and the spiral ridge drives against the protrusions of the holding arm to move the holding arm inward and outward in the radial direction to secure a workpiece and release a workpiece.

Another aspect of embodiments of the present disclosure is to provide a tool that can secure the holding arms in place against a workpiece. In various embodiments, the tool has a lock to secure the two plates together and prevent rotation of the plates. This also maintains the positions of the holding arms against the workpiece to secure the workpiece. Moreover, the plates can be secured to one another to prevent rotation when the potter's wheel stops spinning abruptly, i.e., the user stops the potter's wheel. If the plates are able to rotate relative to each other when the potter's wheel is stopped, then the rotation can cause the holding arms to release the workpiece, potentially resulting in damage to the workpiece. Some potter's wheels have a servo motor that can stop the wheel within 1/16 of a rotation. Thus, a locking tab is provided on the outer edge of the plates to secure the upper and lower plates together to prevent this damage.

It is an aspect of the present disclosure to provide a tool for a potter's wheel, the tool comprising an upper plate having an arm slot configured to receive a holding arm, the arm slot oriented in a radial direction of the upper plate; a lower plate having a spiral ridge extending from an outer end to an inner end, wherein a distance between the spiral ridge and a center of the lower plate decreases from the outer end to the inner end, wherein the holding arm is configured to engage the spiral ridge, and wherein the upper plate is rotatable relative to the lower plate; wherein, in a first rotational position between the upper and lower plates, the spiral ridge is configured to set the holding arm at a first distance from a center of the upper plate; and wherein, in a second rotational position between the upper and lower plates, the spiral ridge is configured to set the holding arm at a second distance from the center of the upper plate, wherein the first and second rotational positions are distinct and the first and second distances are distinct.

The tool may include one or more of the previous embodiments and optionally further comprise a guide rail portion of the arm slot, wherein the guide rail portion defines a reduced width of the arm slot, and the guide rail portion is configured to retain at least one flange of the holding arm to keep the holding arm retained in the arm slot. The tool may include one or more of the previous embodiments and optionally further comprise a first flange and a second flange laterally extending from one side of the holding arm, wherein the first flange and the second flange are offset in a longitudinal direction of the holding arm to reduce tilt of the holding arm in the arm slot; and a third flange and a fourth flange laterally extending from an opposing side of the holding arm, wherein the third flange and the fourth flange are offset in the longitudinal direction of the holding arm to reduce tilt of the holding arm in the arm slot. The tool may include one or more of the previous embodiments and optionally further comprise a first guide protrusion and a second guide protrusion of the holding arm extending downwardly such that the first guide protrusion is positioned on one side of the spiral ridge, and the second guide protrusion is positioned on an opposing side of the spiral ridge, wherein engagement between the first and second guide protrusions and the spiral ridge translates rotational movement between the upper and lower plates to radial movement of the holding arm toward and away from the center of the upper plate. The tool may include one or more of the previous embodiments and optionally wherein the arm slot is one of a plurality of arm slots, each arm slot is oriented in the radial direction of the upper plate and configured to receive a respective holding arm, and arm slots of the plurality of arm slots are equally spaced with respect to each other about the center of the upper plate; and wherein the spiral ridge is one of a plurality of spiral ridges, each spiral ridge is associated with a respective arm slot of the plurality of arm slots to move the respective holding arm toward and away from the center of the upper plate at different rotational positions between the upper and lower plates. The tool may include one or more of the previous embodiments and optionally further comprise a plurality of apertures in the lower plate configured to receive a plurality of fasteners of the potter's wheel, wherein each aperture of the plurality of apertures is configured to engage a respective fastener of the plurality of fasteners, each aperture having a body portion at least partially extending along a circle defined by a radius; a receiving portion that tapers from the body portion to a point, wherein the point is positioned outside of the circle; and a securing portion positioned on an opposing side of the body portion from the receiving portion, wherein the securing portion tapers from the body portion to at least one lobe that defines a tab, wherein the tab is at least partially positioned inside of the circle, and the tab is configured to deflect against the respective fastener to drive the respective fastener toward the receiving portion to hold the respective fastener. The tool may include one or more of the previous embodiments and optionally further comprise a lock positioned in a lock slot of the upper plate, wherein the lock is configured to deflect and engage a locking ridge of the lower plate with an interference fit to hold a rotational position between the upper and lower plates.

It is another aspect of the present disclosure to provide a tool for a potter's wheel, the tool comprising a lower plate having an upper surface and a lower surface, wherein the lower plate is configured to engage a potter's wheel; a plurality of apertures extending between the upper and lower surfaces of the lower plate, wherein the plurality of apertures is configured to receive a plurality of fasteners of the potter's wheel, each aperture of the plurality of apertures is configured to engage a respective fastener of the plurality of fasteners, and each aperture has a body portion at least partially extending along a circle defined by a radius; a receiving portion that tapers from the body portion to a point, wherein the point is positioned outside of the circle; and a securing portion positioned on an opposing side of the body portion from the receiving portion, wherein the securing portion tapers from the body portion to at least one lobe that defines a tab, wherein the tab is at least partially positioned inside of the circle, and the tab is configured to deflect against the respective fastener to drive the respective fastener toward the receiving portion to hold the respective fastener.

The tool may include one or more of the previous embodiments and optionally further comprise a plurality of relief apertures extending between the upper and lower surfaces of the lower plate, wherein each relief aperture of the plurality of relief apertures is positioned proximate to a securing portion of a respective aperture of the plurality of apertures to allow further deflection of the tab defined by the respective aperture. The tool may include one or more of the previous embodiments and optionally wherein apertures of the plurality of apertures are equally spaced with respect to each other about a center of the lower plate, and apertures of the plurality of apertures are an equal distance from the center of the lower plate. The tool may include one or more of the previous embodiments and optionally further comprise a plurality of second apertures extending between the upper and lower surfaces of the lower plate, wherein the plurality of second apertures is configured to receive a plurality of second fasteners of a second potter's wheel, each second aperture of the plurality of second apertures is configured to engage a respective second fastener of the plurality of second fasteners, and each second aperture has a body portion, a receiving portion, and a securing portion, wherein each second fastener is positioned a distance from a center of the lower plate that is distinct from a distance between each fastener of the plurality of fasteners and the center of the lower plate. The tool may include one or more of the previous embodiments and optionally further comprise a plurality of post holes extending between the upper and lower surfaces of the lower plate, wherein the plurality of post holes is configured to receive a plurality of third fasteners of a third potter's wheel, and each post hole is configured to engage a respective third fastener of the plurality of third fasteners. The tool may include one or more of the previous embodiments and optionally further comprise an upper plate having an arm slot configured to receive a holding arm, the arm slot oriented in a radial direction of the upper plate; a spiral ridge on the upper surface the lower plate extending from an outer end to an inner end, wherein a distance between the spiral ridge and a center of the lower plate decreases from the outer end to the inner end, wherein the holding arm is configured to engage the spiral ridge, and the upper plate is rotatable relative to the lower plate; wherein, in a first rotational position between the upper and lower plates, the spiral ridge is configured to set the holding arm at a first distance from a center of the upper plate; and wherein, in a second rotational position between the upper and lower plates, the spiral ridge is configured to set the holding arm at a second distance from the center of the upper plate, wherein the first and second rotational positions are distinct, and the first and second distances are distinct. The tool may include one or more of the previous embodiments and optionally further comprise a lock positioned in a lock slot of the upper plate, wherein the lock is configured to deflect and engage a locking ridge of the lower plate with an interference fit to hold a rotational position between the upper and lower plates.

It is a further aspect of the present disclosure to provide a tool for a potter's wheel, the tool comprising a lower plate configured to engage the potter's wheel, and the lower plate has a locking ridge extending upwardly from an upper surface of the lower plate; an upper plate that is rotatable relative to the lower plate, wherein a holding arm is engaged with the upper plate, and relative rotation between the lower and upper plates is configured to move the holding arm away or toward a center of the upper plate to secure a workpiece; a lock engaged with a lock slot in the upper plate such that the lock is rotatable relative to the upper plate; wherein, in a down position relative to the upper plate, a downwardly-extending protrusion of the lock is engaged with the locking ridge of the lower plate in an interference fit to hold a rotational position between the upper and lower plates; and wherein, in an up position relative to the upper plate, the protrusion of the lock is disengaged with the locking ridge of the lower plate to permit the relative rotation between the upper and lower plates.

The tool may include one or more of the previous embodiments and optionally wherein two arms at a proximal end of the lock are configured to deflect into respective notches in the lock slot to allow the lock to rotate relative to the upper plate. The tool may include one or more of the previous embodiments and optionally further comprise a plurality of notched recesses in a lower surface of the lower plate, wherein the plurality of notched recess is configured to receive clay to bond the lower plate to the potter's wheel. The tool may include one or more of the previous embodiments and optionally further comprise a screw extending through a center aperture of the upper plate and a center aperture of the lower plate; and a nut and a tension controller washer engaged with a distal end of the screw to secure the upper and lower plates together and allow relative rotation between the upper and lower plates. The tool may include one or more of the previous embodiments and optionally further comprise an arm slot of the upper plate configured to receive the holding arm, wherein the arm slot oriented in a radial direction of the upper plate; a spiral ridge of the lower plate extending from an outer end to an inner end, wherein a distance between the spiral ridge and a center of the lower plate decreases from the outer end to the inner end, wherein the holding arm is configured to engage the spiral ridge; wherein, in a first rotational position between the upper and lower plates, the spiral ridge is configured to set the holding arm at a first distance from the center of the upper plate; and wherein, in a second rotational position between the upper and lower plates, the spiral ridge is configured to set the holding arm at a second distance from the center of the upper plate, wherein the first and second rotational positions are distinct, and the first and second distances are distinct. The tool may include one or more of the previous embodiments and optionally further comprise a plurality of apertures in the lower plate configured to receive a plurality of fasteners of the potter's wheel, wherein each aperture of the plurality of apertures is configured to engage a respective fastener of the plurality of fasteners, each aperture having a body portion at least partially extending along a circle defined by a radius; a receiving portion that tapers from the body portion to a point, wherein the point is positioned outside of the circle; and a securing portion positioned on an opposing side of the body portion from the receiving portion, wherein the securing portion tapers from the body portion to at least one lobe that defines a tab, wherein the tab is at least partially positioned inside of the circle, and the tab is configured to deflect against the respective fastener to drive the respective fastener toward the receiving portion to hold the respective fastener.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

It is to be appreciated that any feature described herein can be claimed in combination with any other feature(s) as described herein, regardless of whether the features come from the same described embodiment. Any one or more aspects described herein can be combined with any other one or more aspects described herein. Any one or more features described herein can be combined with any other one or more features described herein. Any one or more embodiments described herein can be combined with any other one or more embodiments described herein.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
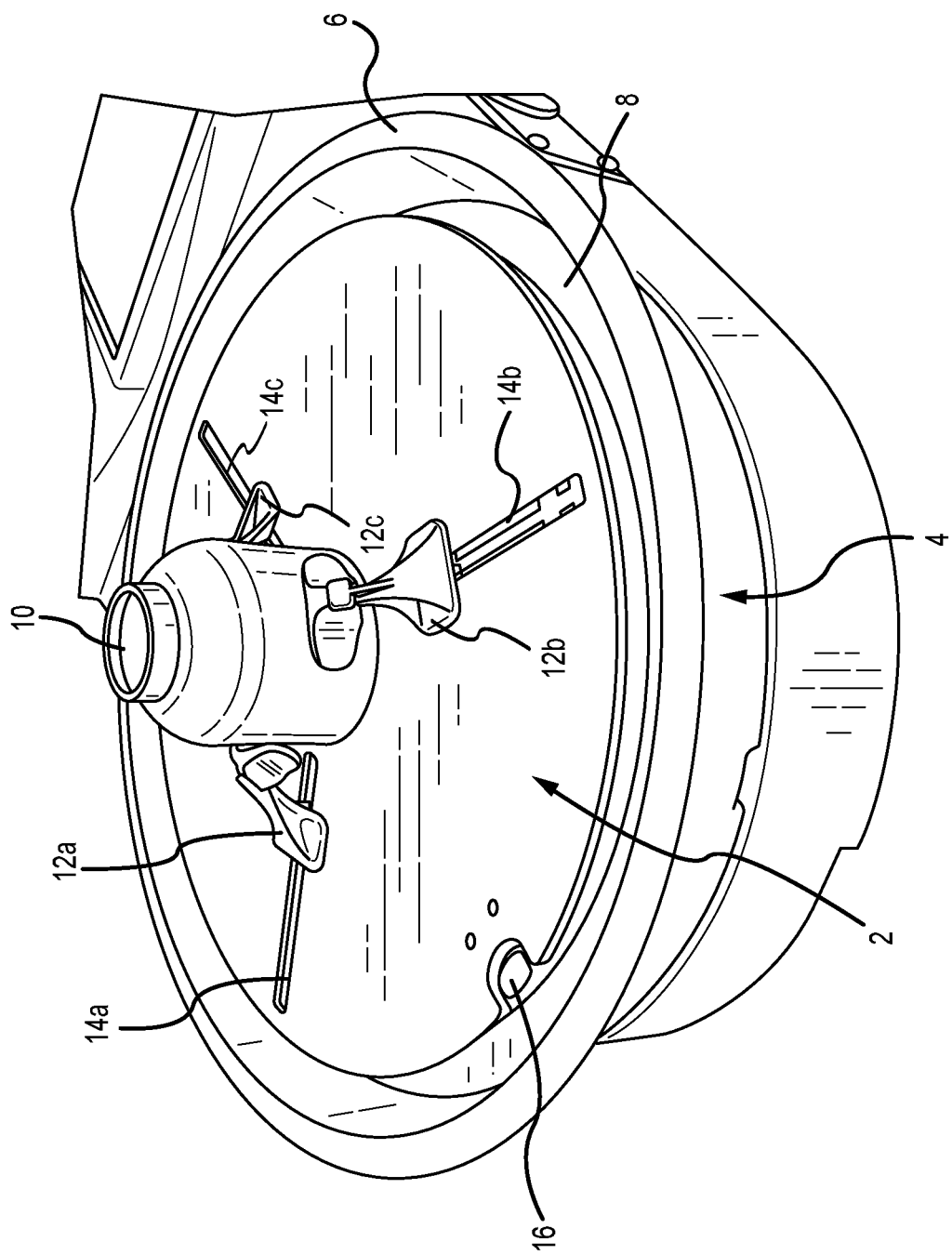
FIG. 1 is a perspective view of a potter's wheel with a tool in accordance with an embodiment of the present disclosure.

The following is a listing of components according to various embodiments of the present disclosure, and as shown in the drawings:

| Number | Component |
| --- | --- |
| 2 | Tool |
| 4 | Potter's Wheel |
| 6 | Splash Pan |
| 8 | Collection Bin |
| 10 | Workpiece |
| 12a, 12b, 12c | Holding Arm |
| 14a, 14b, 14c | Arm Slot |
| 16 | Locking Tab |
| 17 | Spinning Wheel |
| 18 | Upper Plate |
| 20 | Lower Plate |
| 22 | Screw |
| 24 | Nut |
| 26 | Tension Control Washer |
| 28a, 28b, 28c | Spiral Ridge |
| 30 | Fastener |
| 32 | Fastener Cap |
| 34 | Lock Slot |
| 36 | Center Hole |
| 38 | First Rotational Direction |
| 40 | First Radial Direction |
| 42 | Second Rotational Direction |
| 44 | Second Radial Direction |
| 46 | Guide Rail |
| 48 | Additional Guide Rail |
| 50a, 50b | Guide Slot |
| 50c, 50d | Guide Slot |
| 52 | Locking Protrusion |

-continued

| Number | Component |
| --- | --- |
| 54 | First Alignment Pin |
| 56 | Center |
| 58 | Distance |
| 60 | First End |
| 62 | Second End |
| 64a, 64b | Fish-Shaped Aperture |
| 66a, 66b | Post Hole |
| 68 | Second Alignment Pin |
| 70 | Positioning Ridge |
| 72 | Locking Ridge |
| 74 | Notched Recess |
| 76 | Body Portion |
| 78 | Circle |
| 80 | Radius |
| 82 | Receiving Portion |
| 84 | Point |
| 86 | Securing Portion |
| 88a, 88b | Lobe |
| 90 | Tab |
| 92 | Relief Aperture |
| 94 | Attachment Feature |
| 96 | Securing Rail |
| 98a, 98b | Guide Recess |
| 100a | First Flange |
| 100b | Second Flange |
| 102a | Third Flange |
| 102b | Fourth Flange |
| 104 | Gap |
| 106 | First Guide Protrusion |
| 108 | Second Guide Protrusion |
| 110a, 110b | Arm |
| 112 | Body |
| 114 | Button |
| 116 | Locking Protrusion |
| 118 | Channel |
| 120a, 120b | Notch |

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

FIG. 1 is a perspective view of a tool 2 engaged with a potter's wheel 4. The tool 2 centers and holds a workpiece 10, and the potter's wheel comprises a spinning wheel (17 in FIG. 2) that rotates the tool 2 and the workpiece 10. A user can then mold, trim, decorate, or otherwise form the workpiece 10 as the workpiece 10 rotates on the tool 2. The potter's wheel also has a splash pan 6 and collection bin 8 to collect trimmings. The upper surface of the tool 2 is positioned below the tallest point of the splash pan 6 to assist in directing trimmings into the collection bin 8 and not onto the floor. As described herein, the tool 2 comprises holding arms 12a-12c that move in a radial direction in respective arm slots 14a-14c to hold the workpiece 10 in place. A locking tab 16 can be engaged to secure the holding arms 12a-12c and the workpiece 10 in place, and the locking tab 16 can be disengaged to allow the holding arms 12a-12c to move.

Figure 2:
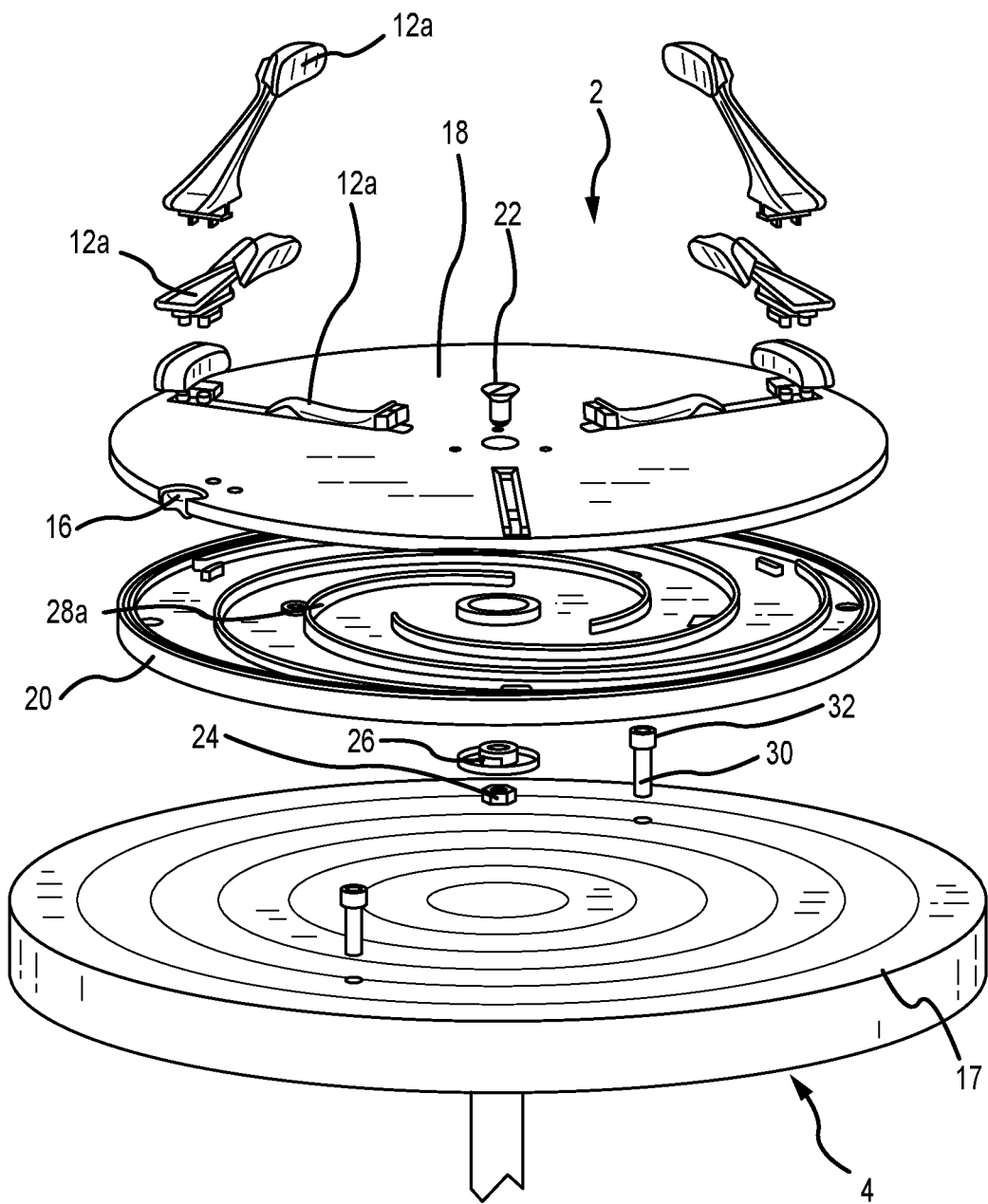
FIG. 2 is an exploded, perspective view of the potter's wheel and the tool in FIG. 1 in accordance with an embodiment of the present disclosure.

FIG. 2 is an exploded perspective view of the potter's wheel 4 and the tool 2. The potter's wheel 4 has a spinning wheel 17, and the tool 2 is engaged to the spinning wheel 17. Two fasteners 30 extend into an upper surface of the spinning wheel 17, and each fastener 30 has a fastener cap 32. In some embodiments, the fasteners 30 are threaded and screw into threaded apertures in the spinning wheel 17 such that only the fastener cap 32 is exposed, and the tool 2 engages the fastener cap 32. It will be appreciated that the present disclosure encompasses embodiments with a variety of fasteners 30 including bat pins, bolts, fasteners with non-cylindrical shapes, etc.

The tool 2 comprises an upper plate 18 and a lower plate 20, and the relative rotation between these plates 18, 20 causes the holding arms 12a to move inward and outward in a radial direction to hold and release a workpiece. A screw 22, a nut 24, and a tension control washer 26 join the plates 18, 20 together at the centers of the plates 18, 20. The lower plate 20 further comprises spiral ridges 28a that engage the holding arms 12a to translate the relative rotational movement of the plates 18, 20 to the inward and outward radial movement of the holding arms 12a, as described herein.

Figure 3:
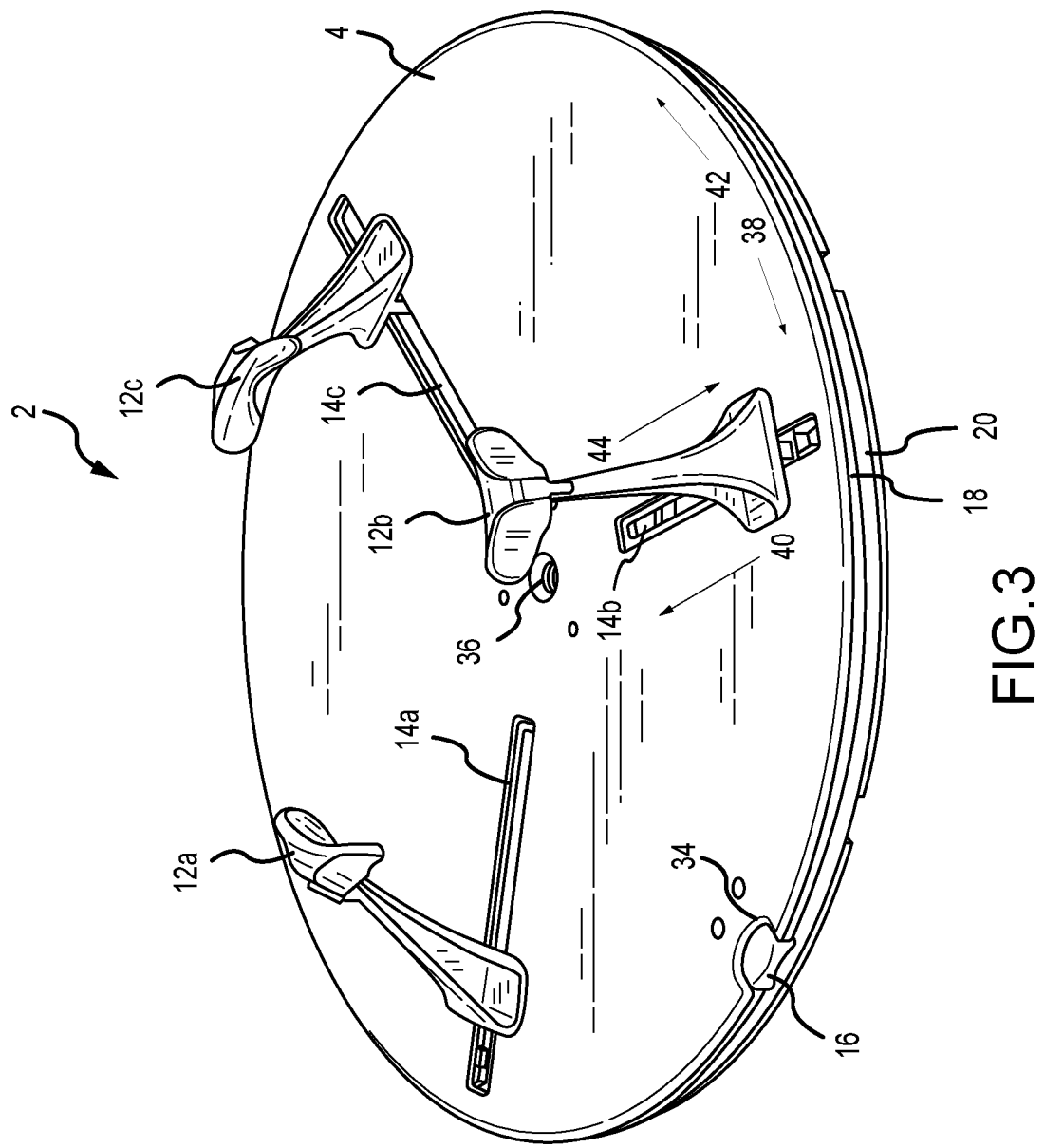
FIG. 3 is a perspective view of a tool in accordance with an embodiment of the present disclosure.

FIG. 3 shows a fully assembled tool 2 according to one embodiment. Three holding arms 12a-12c are arranged around a center of the upper plate 18, which is defined by a center hole 36 through which a screw (22 in FIG. 2) joins the upper plate 18 to the lower plate 20. Each holding arm 12a-12c is positioned in a respective arm slot 14a-14c in the upper plate 18, and each arm slot 14a-14c may extend through the upper plate 18 between an upper surface and a lower surface of the upper plate 18. The holding arms 12a-12c and the arm slots 14a-14c are equally spaced from each other about the center of the upper plate 18. In other words, the arm slots 14a-14c in this embodiment are offset from each other by an angle of 120 degrees. The present disclosure encompasses embodiments where the arm slots 14a-14c are not equally spaced or offset from each other. For example, the first and second arm slots 14a, 14b may be offset from each other by an angle of 100 degrees, and then the third arm slot 14c is offset from the first and second arm slots 14a, 14b by 130 degrees, each. It will be appreciated that the present disclosure encompasses embodiments with more or fewer holding arms 12a-12c and arm slots 14a-14c. For instance, the tool may have more than three holding arms 12a-12c and arm slots 14a-14c, six holding arms 12a-12c and arm slots 14a-14c, etc. Similarly, the present disclosure encompasses embodiments where the holding arms 12a-12c and arm slots 14a-14c are not equally spaced from each other about the center of the upper plate 18.

In the depicted embodiment, the relative rotation between the plates 18, 20 causes the holding arms 12a-12c to move inward or outward in the radial direction. Specifically, rotation of the upper plate 18 in a first rotational direction 38 causes the holding arms 12a-12c to move in an inward radial direction 40 to hold a workpiece. Conversely, rotation of the upper plate 18 in a second rotational direction 42 causes the holding arms 12a-12c to move in an outward radial direction 44 to release a workpiece. One relative rotational position between the plates 18, 20 and radial position of the holding arms 12a-12c is shown in FIG. 3, and another relative rotational position between the plates 18, 20 and radial position of the holding arms 12a-12c is shown in FIG. 1 where the holding arms 12a-12c are closer to a center of the tool 2 and are securing a workpiece. In other embodiments, the upper plate 18 rotates in the second rotational direction 42 to cause the holding arms 12a-12c to move in the inward radial direction 40, and the upper plate 18 rotates in the first rotation direction 38 to cause the holding arms 12a-12c to move in the outward radial direction 44. It will be appreciated that the inward radial direction 40 and the outward radial direction 44 can include directions that form an angle between 0 degrees and 90 degrees with the radial direction, or a direction that otherwise comprises an inward radial component or an outward radial component.

Figure 4A:
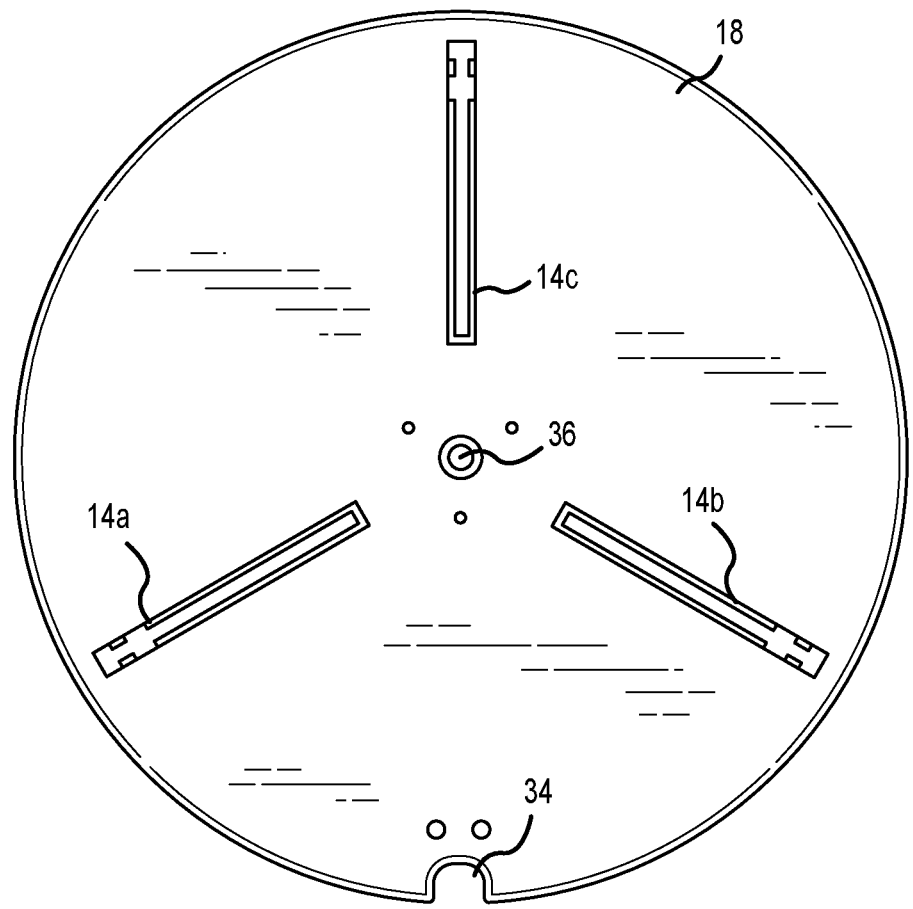
FIG. 4A is a top plan view of the upper plate of the tool in FIG. 3 in accordance with an embodiment of the present disclosure.
Figure 4B:
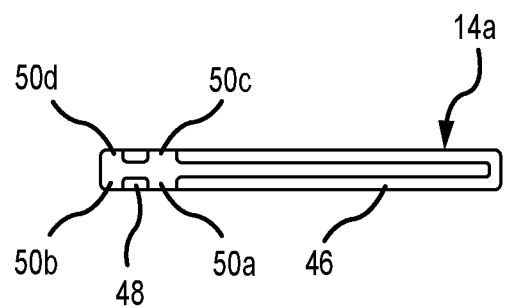
FIG. 4B is an enlarged view of the arm slot of the upper plate in FIG. 4A in accordance with an embodiment of the present disclosure.
Figure 5:
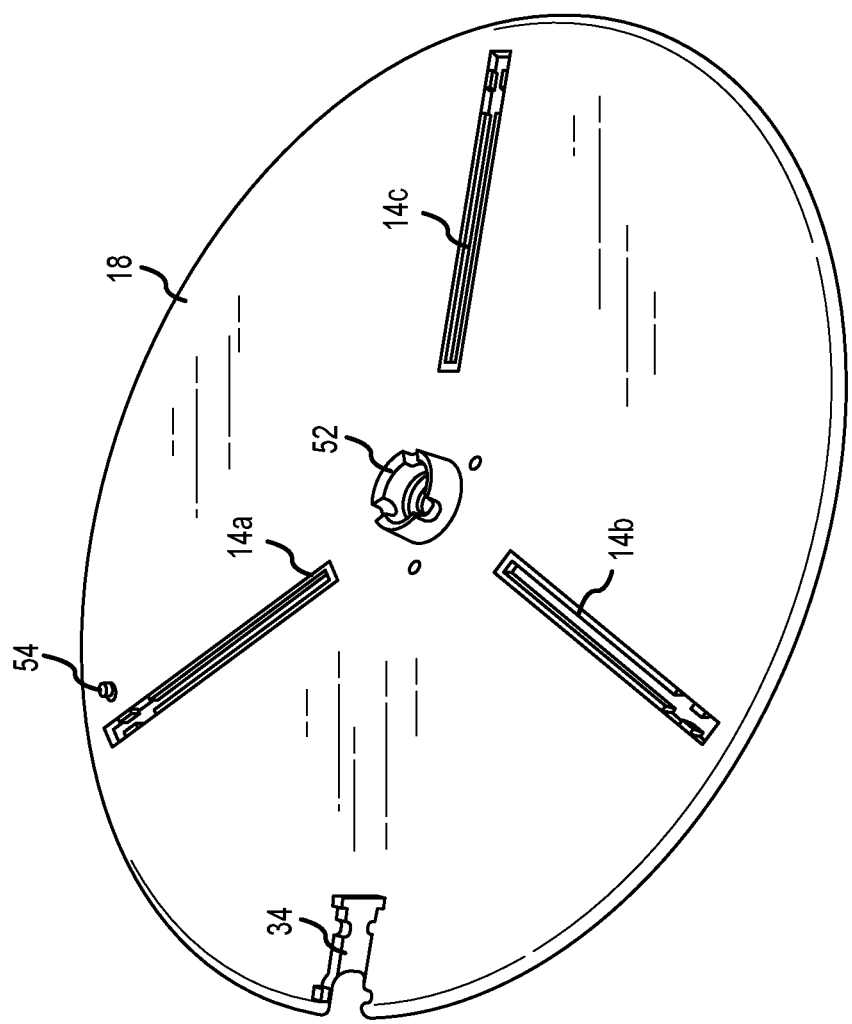
FIG. 5 is a bottom perspective view of the upper plate in FIG. 4A in accordance with an embodiment of the present disclosure.

FIG. 4A shows a top plan view of the upper plate 18, FIG. 4B shows a top plan view of an arm slot 14a, and FIG. 5 shows a bottom perspective view of the upper plate 18. As described herein, the upper plate 18 comprises three arm slots 14a-14c arranged around a center hole 36. FIG. 4B shows that an arm slot 14a comprises a guide rail 46 that defines a reduced width of the arm slot 14a, and an additional guide rail 48 extends along a smaller length of the arm slot 14a than the guide rail 46. The additional guide rail 48 also defines a reduced width of the arm slot 14a and is offset from the guide rail 46 and one end of the arm slot 14a to define guide slots 50a-50d that have the full width of the arm slot 14a. As described herein, this arrangement of guide rails 46, 48 and guide slots 50a-50d operates with features of a holding arm to allow the holding arm to be initially positioned into the arm slot 14a, and then allow the holding arm to traverse the arm slot 14a during operation of the tool.

FIGS. 4A and 5 further show a lock slot 34 to receive a locking tab (16 in FIG. 1) as described herein, and FIG. 5 shows a locking protrusion 52 that surrounds the center hole 36 and is configured to engage the lower plate. A first alignment pin 54 extends from a lower surface of the upper plate 18 as shown in FIG. 5. The first alignment pin 54 contacts a second alignment pin (68 in FIG. 6) to establish an initial rotational position between the upper plate 18 and the lower plate. This initial rotational position allows the user to insert holding arms into the arm slots 14a-14c.

Figure 6:
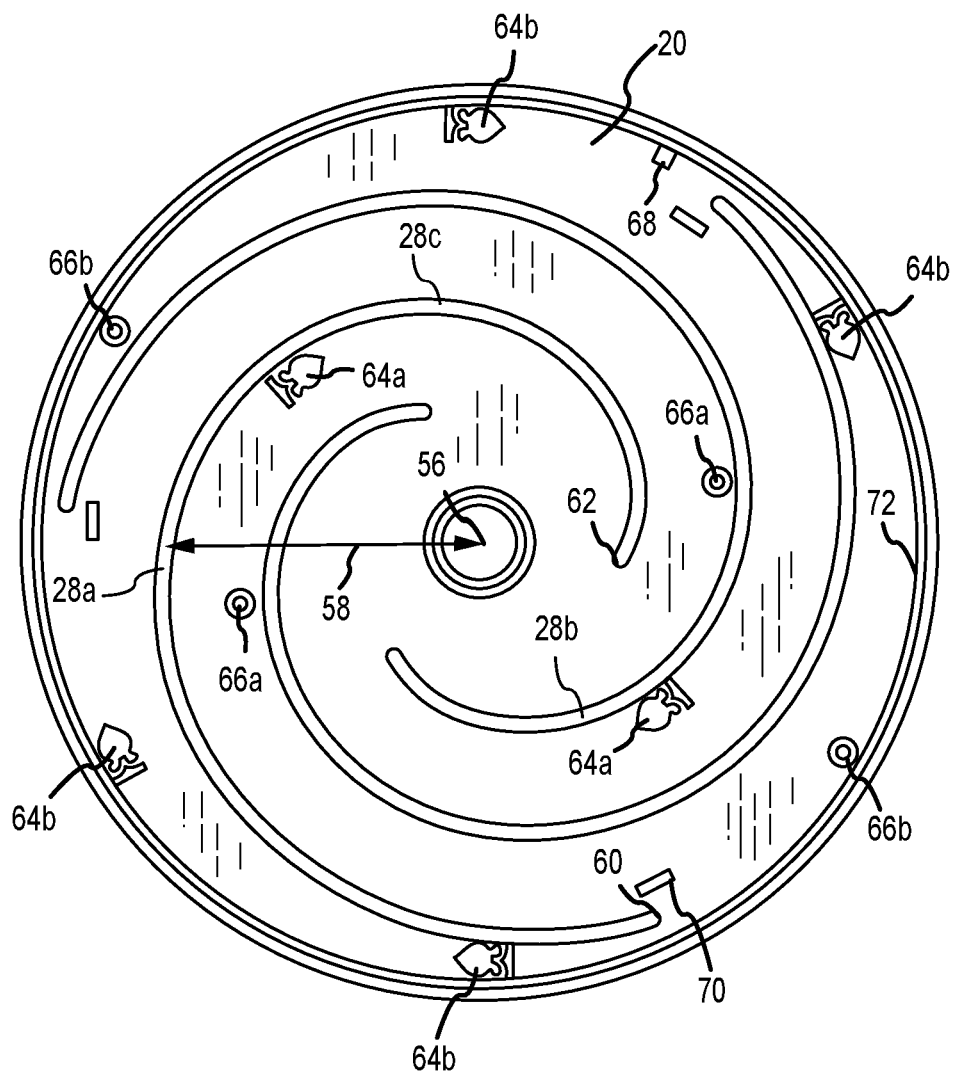
FIG. 6 is a top plan view of the lower plate of the tool in FIG. 3 in accordance with an embodiment of the present disclosure.
Figure 7:
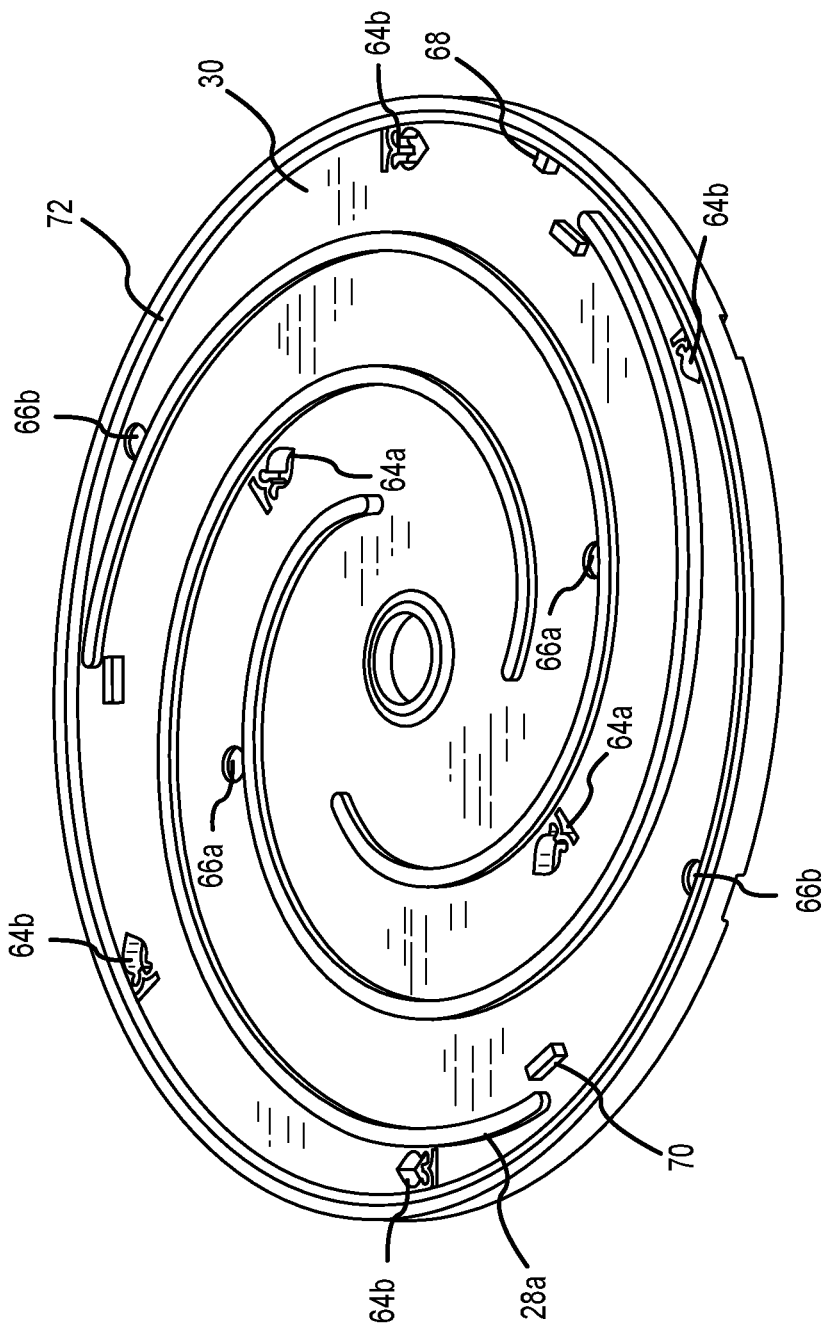
FIG. 7 is a top perspective view of the lower plate in FIG. 6 in accordance with an embodiment of the present disclosure.

FIGS. 6 and 7 show a top plan view and a top perspective view, respectively, of an embodiment of the lower plate 20. The lower plate 20 comprises fish-shaped apertures 64a, 64b and post holes 66a, 66b to engage various types of fasteners on the spinning wheel of a potter's wheel, as described herein. The fish-shaped apertures 64a, 64b and post holes 66a, 66b may extend through the lower plate 20 between an upper surface and a lower surface of the lower plate 20. Different brands of potter's wheels use different fasteners and sizes thereof. Some potter's wheels have integrated posts that allow for attachment of a tool similar to the present disclosure. Other potter's wheels contain various holes to allow a fastener to secure the tool to the potter's wheel.

The fish-shaped apertures 64a, 64b are configured to engage a fastener such as an attachment screw or pin and thereby secure the tool to the spinning potter's wheel. Most potter's wheels use either a ¼ inch (6.35 mm) or 10 mm socket head cap screw with a screw cap. However, even with ¼ inch (6.35 mm) or 10 mm screw caps, various brands of potter's wheels have slightly different sized screw caps. As different potter's wheels contain different sizes of fasteners, screws, and screw caps, the shape of the fish-shaped aperture 64a, 64b ensures that different sizes of pins and screw caps are pushed into the narrowest portion of the aperture by pushing the socket head cap screw laterally from the tail. The opposite fish-shaped aperture 64a, 64b also pushes the other socket head cap screw in in the narrowest portion of the fish-shaped aperture 64a, 64b such that a good center is maintained. Operation of the fish-shaped apertures 64a, 64b is described in detail with respect to FIG. 10. In some embodiments, the screw caps are further secured by the rotational force of the spinning wheel. This prevents rattling or chatter that can be produced by a loose connection between the lower plate and the pins, screws, or fasteners of the potter's wheel.

In addition to the fish-shaped apertures 64a, 64b, post holes 66a, 66b (i.e., circular apertures) are provided to engage posts or studs used by some potter's wheels. The tool can be inserted onto the posts or studs and secured in place. The post holes 66a, 66b are typically used when the user uses clay between the tool and the spinning potter's wheel. The multiple locations of the posts provide for the common post diameters and locations used in most spinning wheels.

In FIG. 6, a pair of first fish-shaped apertures 64a are equally spaced from each other about a center 56 of the lower plate 20. Similarly, a plurality of second fish-shaped apertures 64b are unequally spaced from each other about the center 56 of the lower plate 20. A pair of first post holes 66a are equally spaced from each other about the center of the lower plate 20, and a pair of second post holes 66b are also equally from each other about the center of the lower plate 20. Again, the apertures 64a, 64b and post holes 66a, 66b may have different sizes and arrangements to accommodate various fasteners sizes and arrangements for different potter's wheels. For instance, first fish-shaped apertures 64a engage first fasteners on a first potter's wheel, second fish-shaped apertures 64b engage second fasteners on a second potter's wheel, first post holes 66a engage first posts on a third potter's wheel, and second post hole 66b engage second posts on a fourth potter's wheel. Moreover, the apertures 64a, 64b are oriented in a preferred direction in FIG. 6, but may be oriented in either rotational direction to accommodate a spinning wheel that rotates in the clockwise or counterclockwise directions.

Spiral ridges 28a-28c extend upwardly from an upper surface of the lower plate 20 and engage respective holding arms (12a-12c in FIG. 1) to translate the relative rotational movement of the upper plate (18 in FIG. 5) and the lower plate 20 to the radial movement of the holding arms 12a-12c. A given spiral ridge 28a-28c extends from a first end 60 to a second end 62, and a distance 58 between the spiral ridge 28a-28c and the center 56 of the lower plate 20 continuously decreases from the first end 60 to the second end 62. A holding arm (12a in FIG. 1), in effect, rides the spiral ridge 28a closer or farther from the center 56 depending on the relative rotational direction of the plates. In FIG. 6, the lower plate 20 has three spiral ridges 28a-28c symmetrically arranged about the center 56 of the lower plate 20. However, it will be appreciated that the lower plate 20 may have any number of spiral ridges 28a-28c in any orientation. In some embodiments, the number of spiral ridges 28a-28c may be the same as the number of holding arms, for instance, more than two, three, or even six holding arms, or the number of spiral ridges 28a-28c may be different than the number of holding arms.

The lower plate 20 also includes one or more positioning ridges 70 located radially inwards from the first ends 60 of the spiral ridges 28a-28c. The positioning ridges 70 ensure that the holding arms are properly aligned to engage the spiral ridges 28a-28c. The lower plate 20 has a second alignment pin 68 that engages a first alignment pin (54 in FIG. 5) of the upper plate to set the starting position of the plates. Furthermore, a locking ridge 72 is located proximate to the outer circumference of the lower plate 20 and is positioned radially inside the raised perimeter edge of the lower plate 20. A channel (118 in FIG. 16) between the locking ridge 72 and the raised edge allows the locking tab to press between the locking ridge 72 and the perimeter edge to rotationally lock the upper plate to the lower plate 20.

Figure 8:
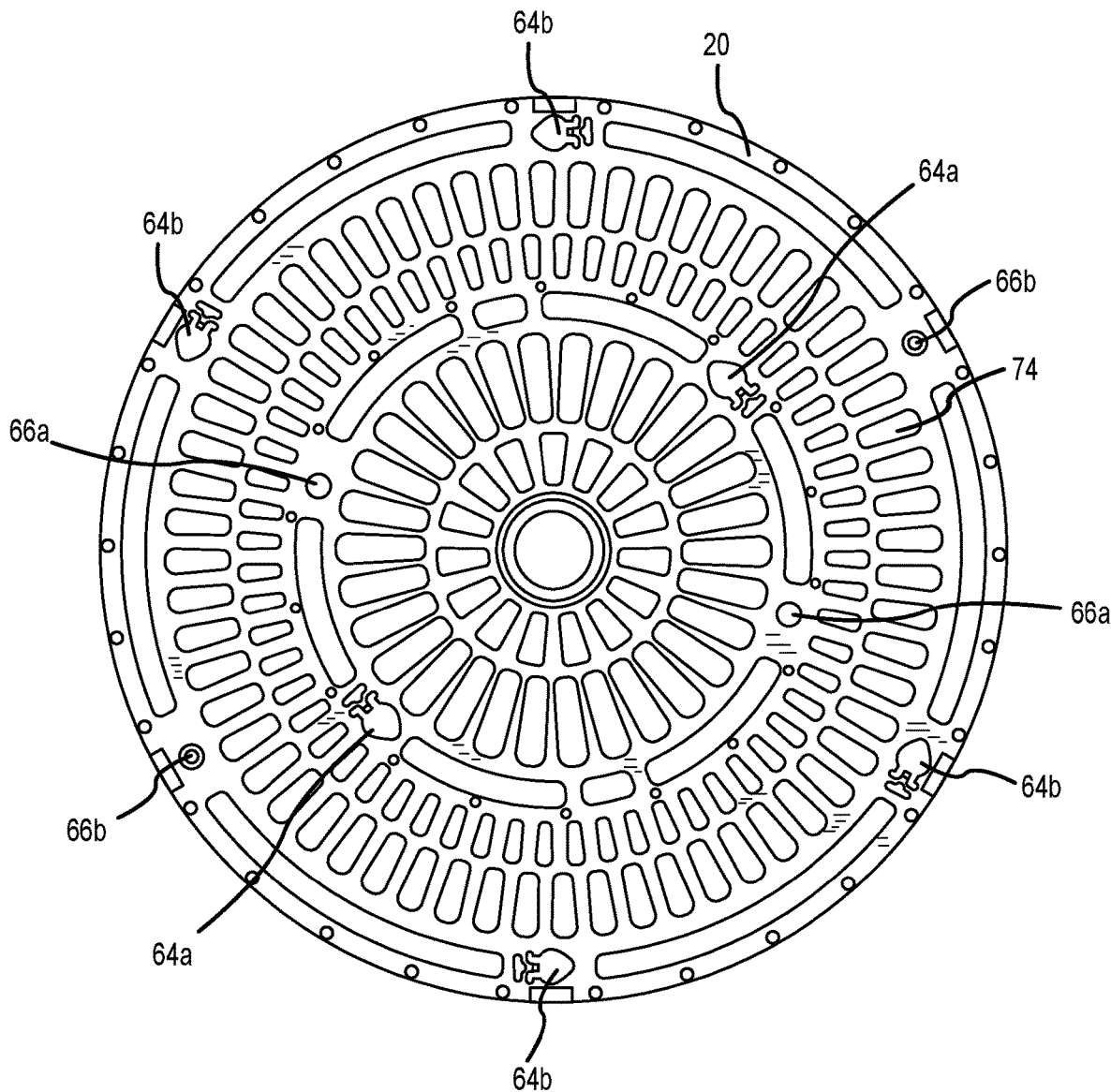
FIG. 8 is a bottom plan view of the lower plate in FIG. 6 in accordance with an embodiment of the present disclosure.
Figure 9:
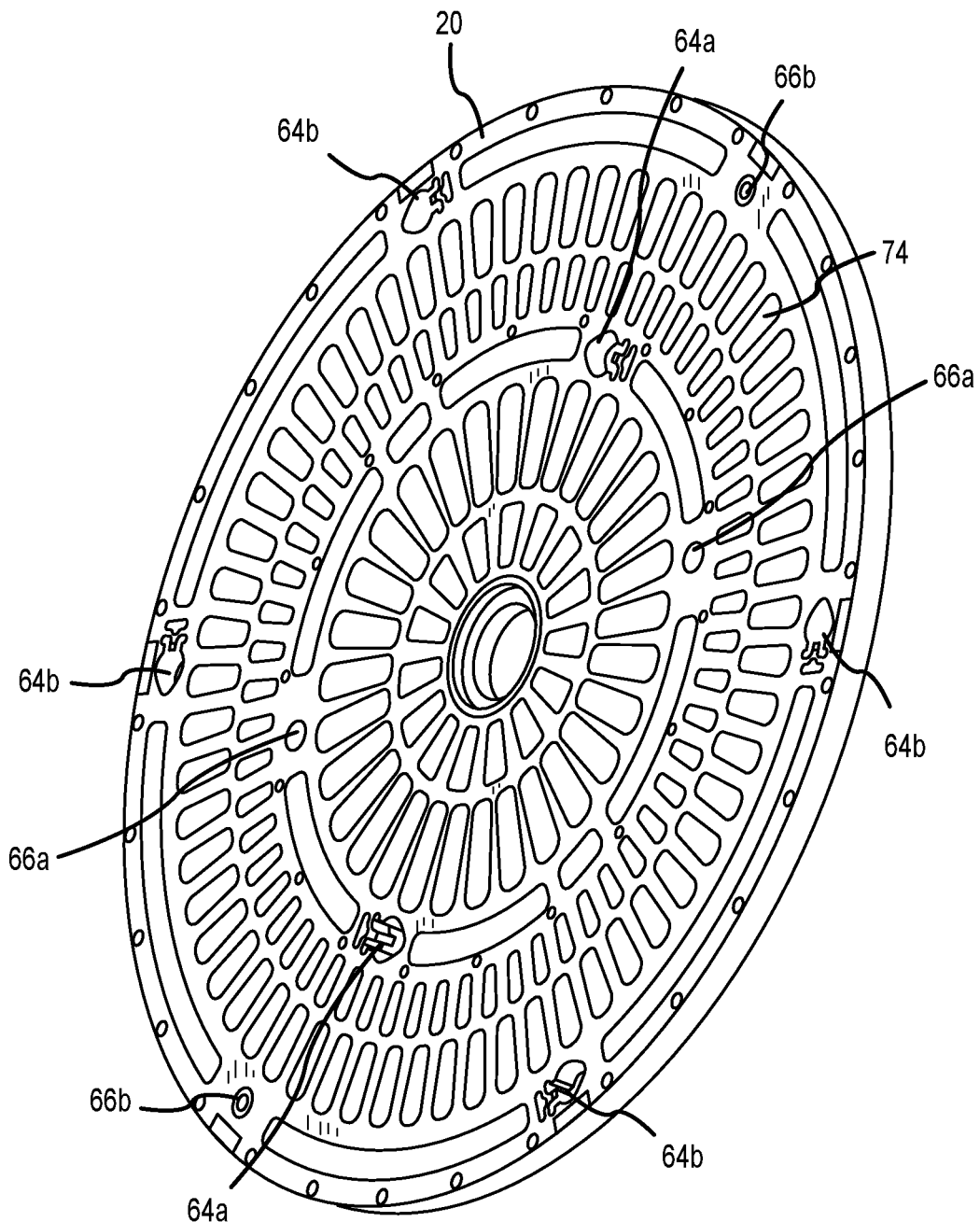
FIG. 9 is a bottom perspective view of the lower plate in FIG. 6 in accordance with an embodiment of the present disclosure.

FIG. 8 is a bottom plan view of the lower plate 20, and FIG. 9 is a bottom perspective view of the lower plate 20. These figures show the various apertures 64a, 64b and post holes 66a, 66b extending through the lower plate 20. However, some spinning wheels do not use, or only use in part, posts or pins/screws/fasteners to attach the tool to the potter's wheel. In these models, the tool can be secured to the potter's wheel by putting clay between the spinning wheel of the potter's wheel and the lower plate 20 of the tool. To assist with this attachment mechanism, several notched regions 74 are formed in the bottom surface of the lower plate 20. These recesses or notches 74 enable and assist clay to stick to the bottom of the lower plate 20 to more securely stick the tool to the spinning wheel.

Figure 10:
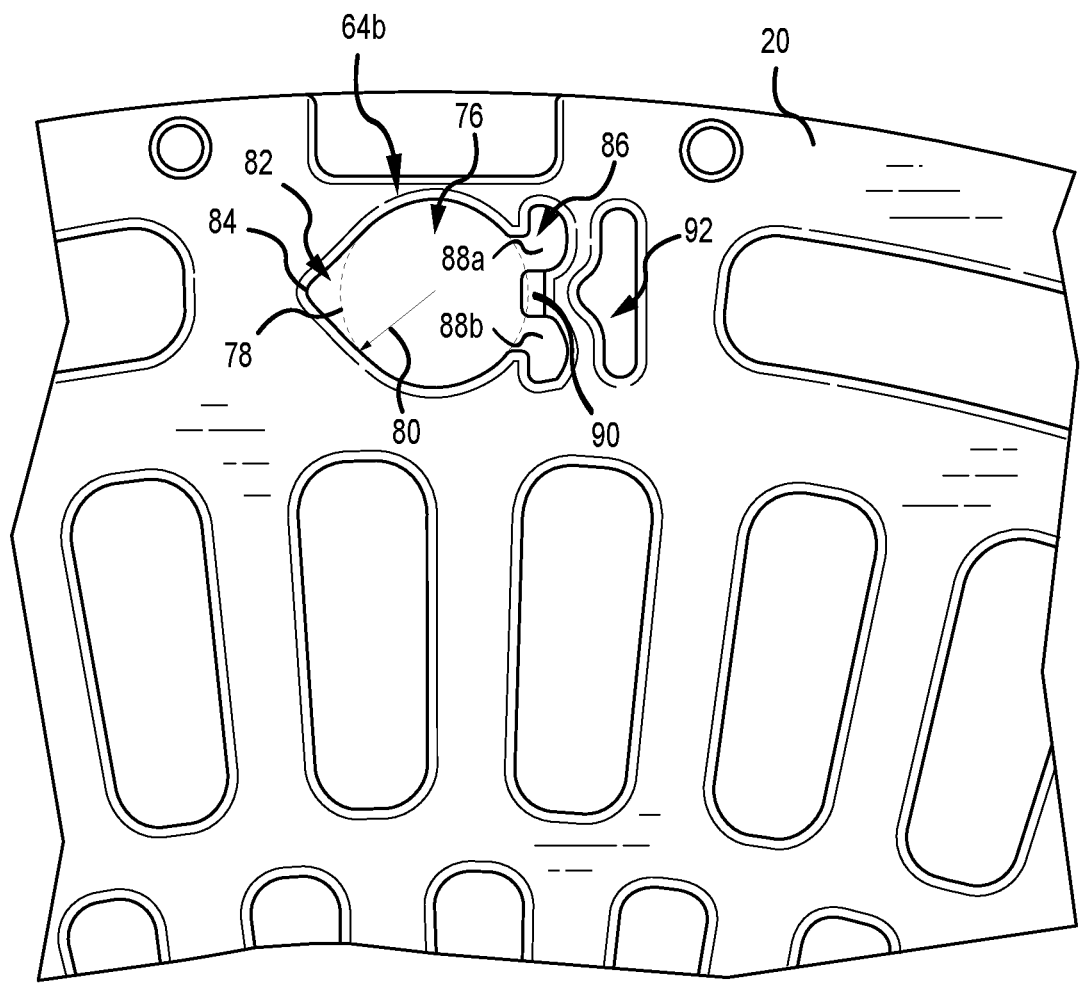
FIG. 10 is a bottom plan enlarged view of the fish-shaped aperture in the lower plate in FIG. 8 in accordance with an embodiment of the present disclosure.

FIG. 10 is an enlarged, bottom plan view of the fish-shaped aperture 64b in the lower plate 20. In this embodiment, the aperture 64b comprises a body portion 76, a head or receiving portion 82, and a tail or securing portion 86. Generally, the body portion 76 is configured to receive a fastener of the potter's wheel, and the securing portion 86 is configured to push the fastener toward the receiving portion 82 to secure the lower plate 20 and the tool to the potter's wheel. This configuration also reduces chatter between the tool and the potter's wheel and promotes the longevity of the tool.

In this embodiment, the body portion 76 generally follows part of the shape of a circle 78 defined by a radius 80. The size of the radius 80 is selected to accommodate expected radii of various fasteners on potter's wheels and variations thereof due to, for instance, manufacturing tolerances. The receiving portion 82 of the aperture 64b tapers from the body portion 76 inwardly to a point 84, which is positioned outside of the circle 78. This shape of the receiving portion 82 allows a generally cylindrical-shaped fastener to be wedged in place, regardless of variations in the radii of different fasteners.

The securing portion 86 of the aperture 64b is positioned on an opposite side of the body portion 76 from the receiving portion 82. The securing portion 86 tapers from the body portion 76 inwardly, and then expands outwardly in at least one lobe 88a, 88b. In this embodiment, there are two lobes 88a, 88b that define a tab 90 therebetween, and the tab 90 is at least partially positioned in the circle 78. With this arrangement, a fastener having the same radius as the circle 78 extends into the aperture 64b and deflects the tab 90, which holds the fastener in place. Further, a fastener with a slightly smaller cross section than the circle 80 extends into the aperture 64b to deflect the tab 90, though by a smaller amount, which then drives the fastener into the receiving portion 82 to hold the fastener in place. It will be appreciated that the securing portion 86 may have fewer or more lobes 88a, 88b, for example, three lobes that define two tabs. Moreover, the aperture 64b has bilateral symmetry as shown in FIG. 10. It will be appreciated that the present disclosure encompasses embodiments with an asymmetric arrangement with asymmetric lobes 88a, 88b, a point 84 that is offset from a centerline, etc.

A relief aperture 92 extends through the lower plate 20 to promote the deflection of the tab 90. The relief aperture 92 is positioned proximate to the securing portion 86 of the aperture 64b such that the tab 90 joins the lower plate 20 at only two points. This focuses deflection and deformation forces at these two points, which allows the tab 90 to more easily deflect and receive a fastener from a potter's wheel.

Figure 11:
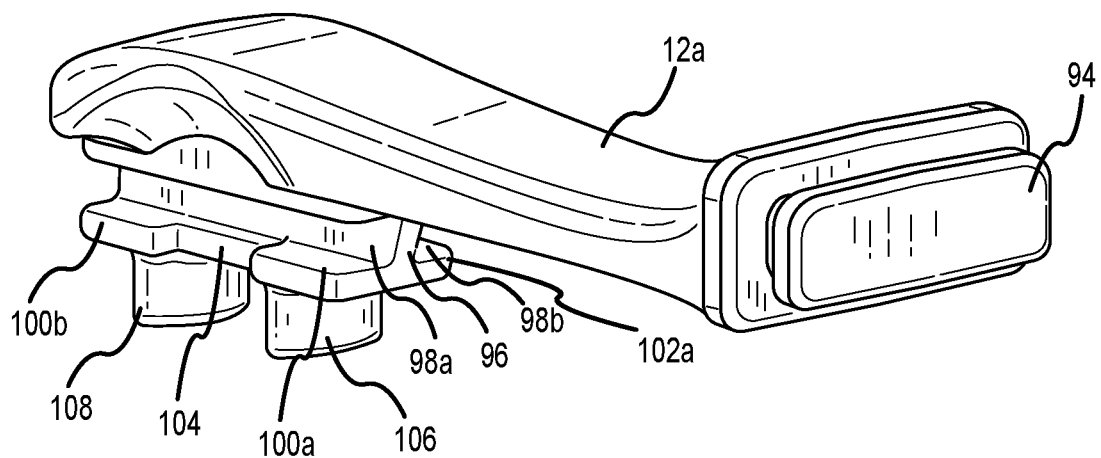
FIG. 11 is a perspective view of a holding arm in accordance with an embodiment of the present disclosure.
Figure 12:
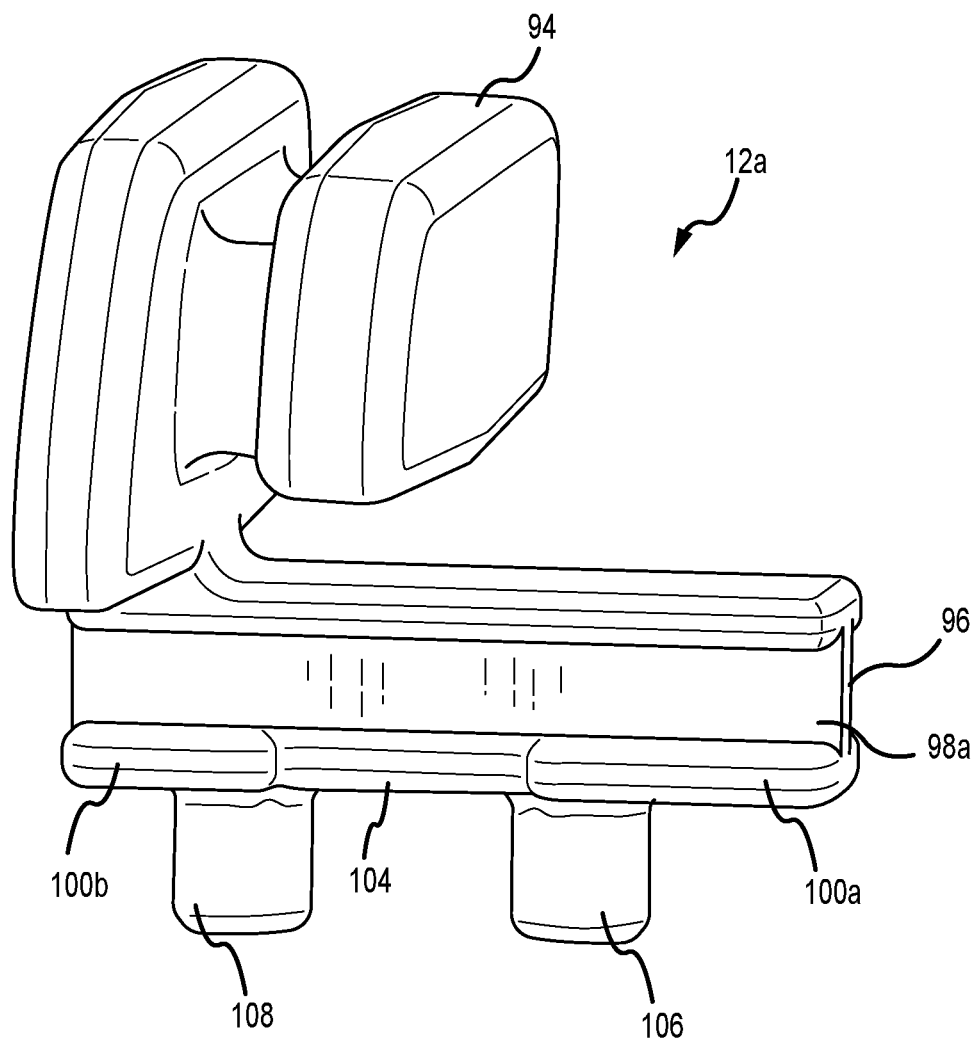
FIG. 12 is a perspective view of another holding arm in accordance with an embodiment of the present disclosure.
Figure 13:
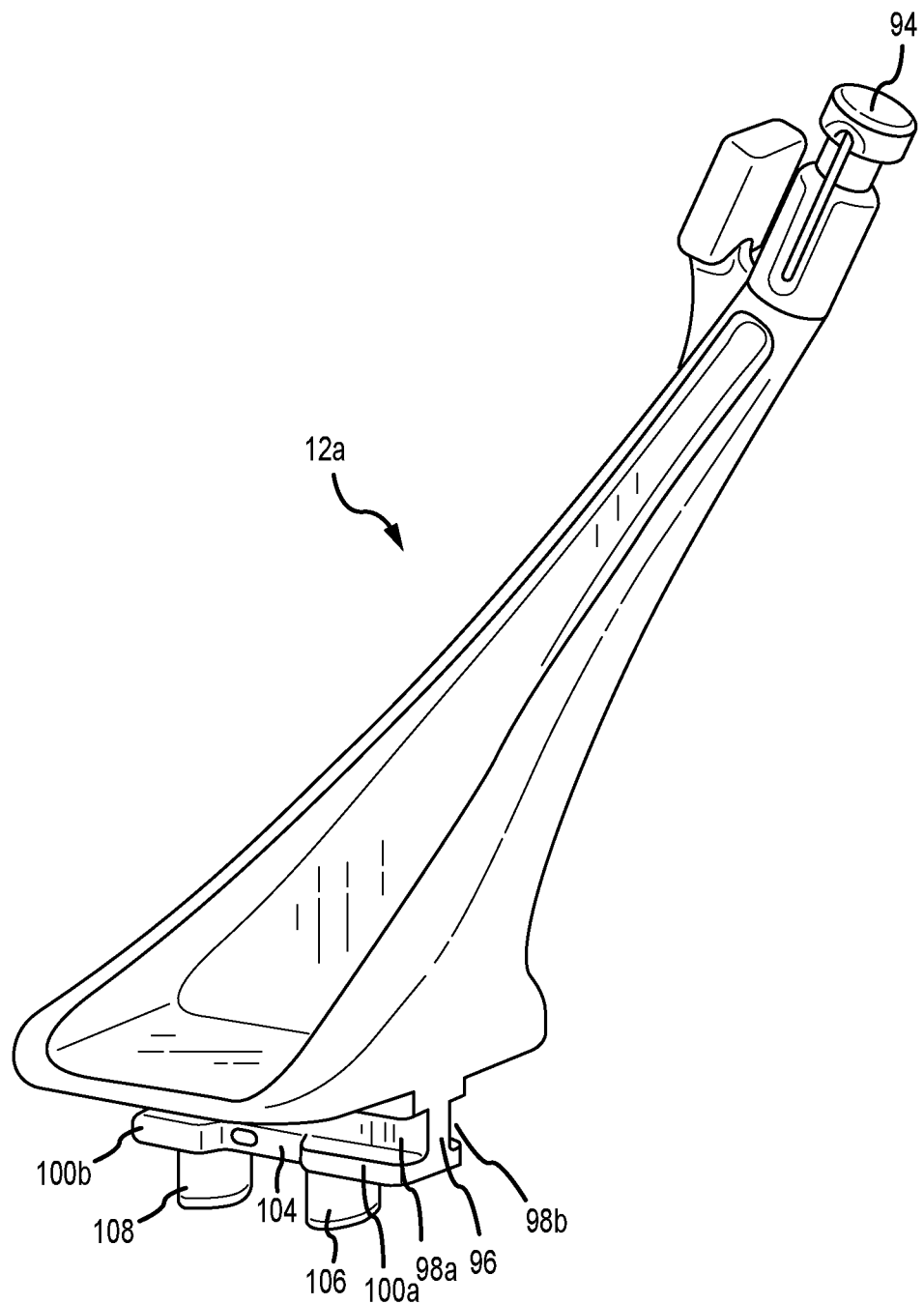
FIG. 13 is a perspective view of a further holding arm in accordance with an embodiment of the present disclosure.

FIGS. 11-13 depict embodiments of the holding arms 12a, which hold the workpiece on the tool and thus the spinning potter's wheel. The various embodiments of the holding arms 12a have different attachment features 94 to engage different workpieces in different manners. FIG. 11 depicts a first holding arm 12a, which is configured to engage the arm slot (14a in FIG. 4B) of an upper plate as well as the spiral ridge (28a in FIG. 6) of a lower plate. The holding arm 12a has a securing rail 96 extending downward and running along the longitudinal axis or direction of the holding arm 12a. Guide recesses 98a, 98b are defined on either side of the securing rail 96, and the securing rail 96 is sufficiently narrow to pass along the reduced width defined by the guide rail (46 in FIG. 4B). A first flange 100a and a second flange 100b extend laterally from one side of the securing rail 96 and are offset along the longitudinal direction to define a gap 104 therebetween. A third flange 102a and a fourth flange 102b (not visible) extend laterally from an opposite side of the securing rail 96 and are also offset along the longitudinal direction to define a gap therebetween. The flanges 100a, 100b, 102a, 102b define a width that is larger than the reduced width defined by the guide rail (46 in FIG. 4B). The flanges 100a, 100b, 102a, 102b correspond to the guide slots (50a-50d in FIG. 4B) of the arm slot (14a in FIG. 4B), and the gaps 104 corresponds to the additional guide rail (48 in FIG. 4B) of the arm slot.

With this arrangement between the holding arm 12a and the arm slot, the holding arm 12a is configured to drop in vertically at one end of the arm slot such that the flanges 100a, 100b, 102a, 102b pass by the respective guide slots (50a-50d in FIG. 4B), and the gaps 104 pass by the additional guide rail (48 in FIG. 4B). As the holding arm 12a advances inwardly in the arm slot, the guide rail (46 in FIG. 4B) of the arm slot extends into the guide recesses 98a, 98b of the holding arm 12a, and the flanges 100a, 100b, 102a, 102b of the holding arm 12a retain the holding arm 12a against the guide rail (46 in FIG. 4B) of the arm slot in the vertical direction. The longitudinal disposition of the flanges 100a, 100b, 102a, 102b limits tilting of the holding arm 12a to more accurately and precisely contact the workpiece.

Extending further below the flanges 100a, 100b, 102a, 102b are a first protrusion 106 and a second protrusion 108 that engage the respective spiral ridge (28a in FIG. 6). In the initial alignment between the plates, the holding arm 12a vertically drops into the arm slot, as described herein, and the first protrusion 106 is positioned on an inward side of the spiral ridge, and the second protrusion 108 is positioned on an outward side of the spiral ridge. Then, as the plates rotate relative to each other, the distance between the spiral ridge, as located under the arm slot, and the center of the lower plate decreases, and the spiral ridge drives against the first protrusion 106 to pull the holding arm 12a inward in the radial direction. In an opposite rotational direction, the distance between the spiral ridge and the center of the lower plate increases, and the spiral ridges drives against the second protrusion 108 to push the holding arm 12a outward in the radial direction.

The holding arm 12a of FIG. 12 has an attachment feature 94 located above the securing rail 96. The attachment feature 94 can be located at any point above the securing rail 96 and along the longitudinal axis of the securing rail 96. A further embodiment of a holding arm 12a is shown in FIG. 13 where the holding arm 12a includes an attachment feature 94 that is raised above the securing rail 96. This holding arm 12a is ideal for securing a workpiece having a wider radius above the base of the workpiece. The workpiece is more secure when the raised wider portion is supported rather than a narrower bottom portion. This can also reduce torsion along a thin diameter area, such as a stem of a vase or glass, when stopping the spinning potter's wheel. By supporting and securing the raised wider portion, the torsion is reduced as the raised wider portion is secured in place to resist twisting.

Figure 14:
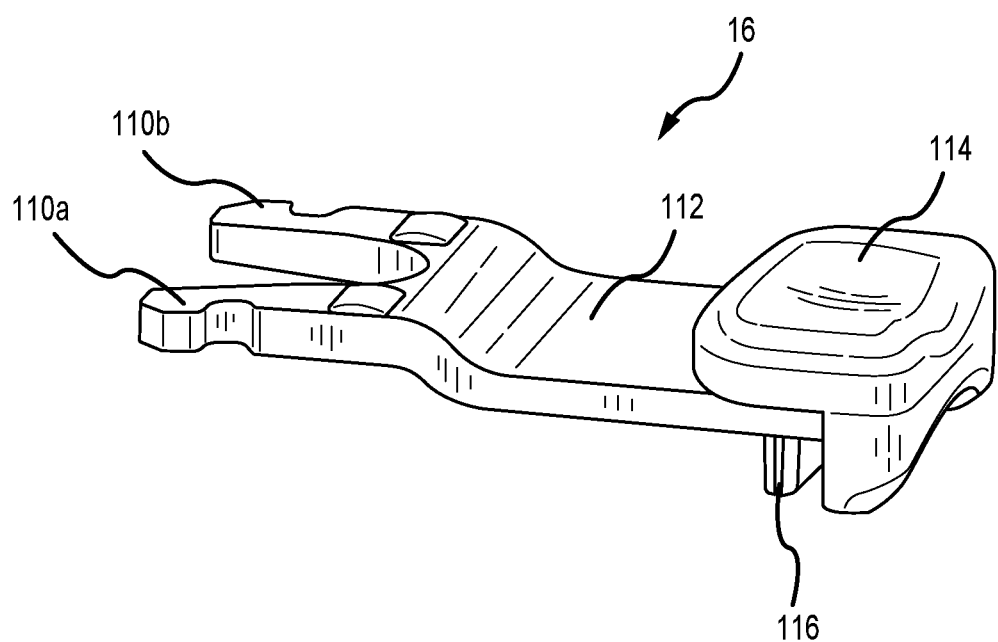
FIG. 14 is a top perspective view of a locking tab in accordance with an embodiment of the present disclosure.
Figure 15:
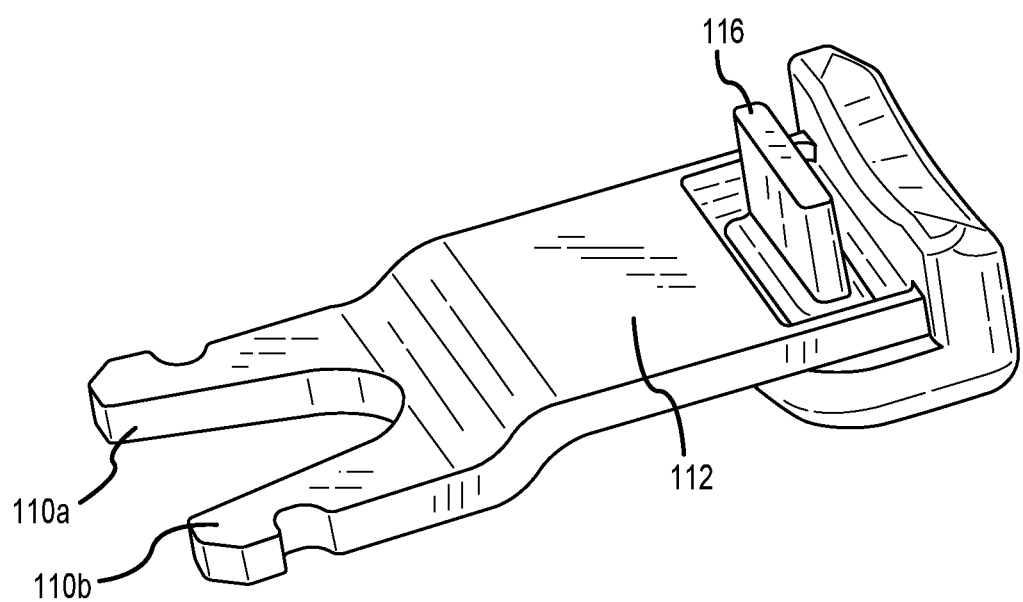
FIG. 15 is a bottom perspective view of the locking tab in FIG. 14 in accordance with an embodiment of the present disclosure.

FIGS. 14 and 15 show a top perspective view and a bottom perspective view, respectively, of a locking tab 16. The locking tab 16 comprises a body 112 and two arms 110a, 110b that extend from the body 112. The arms 110a, 110b are deflectable from the body 112 to secure the tab 16 in the lock slot (34 in FIG. 4A). The arms 110a, 110b click into the lock slot by being pressed toward one another. The outer surface of each arm 110a, 110b has a notch to prevent the locking tab 16 from falling out when in use. With reference to FIG. 4A, a lock slot 34 is provided on the perimeter of the upper plate 18. The lock slot 34 has notches (120a, 120b in FIG. 17) at the end of the slot 34 to allow arms 110a, 110b of the locking tab 16 to secure the locking tab 16 in the slot 34. The locking tab 16 is thus press fit into the slot 34 to prevent removal of the tab 16. A locking protrusion 116 extends downwardly from the body 112 to engage and disengage the locking tab 16 as described herein.

Figure 16:
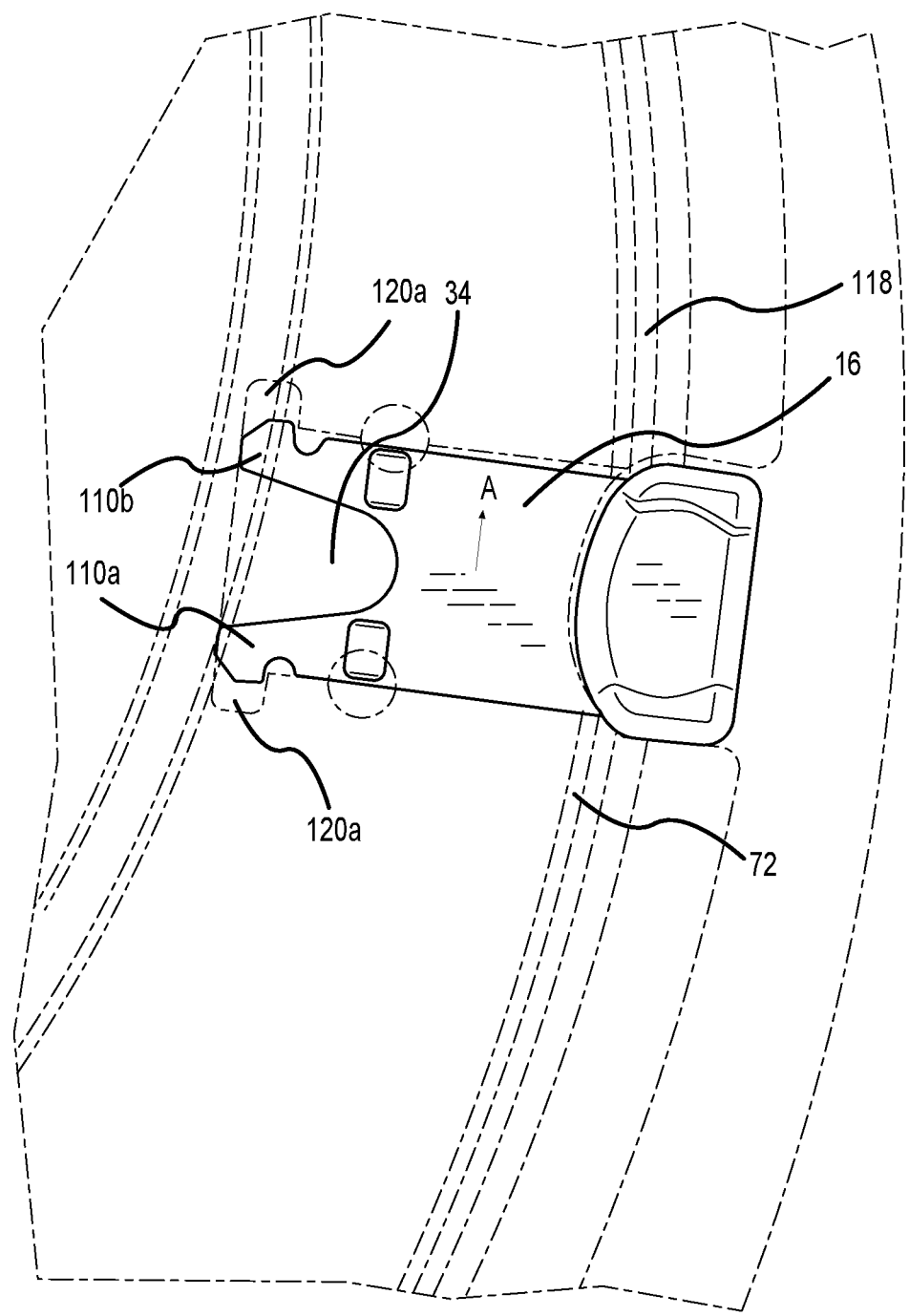
FIG. 16 is a top plan view of the tool and locking tab with the upper plate shown in phantom in accordance with an embodiment of the present disclosure.
Figure 17:
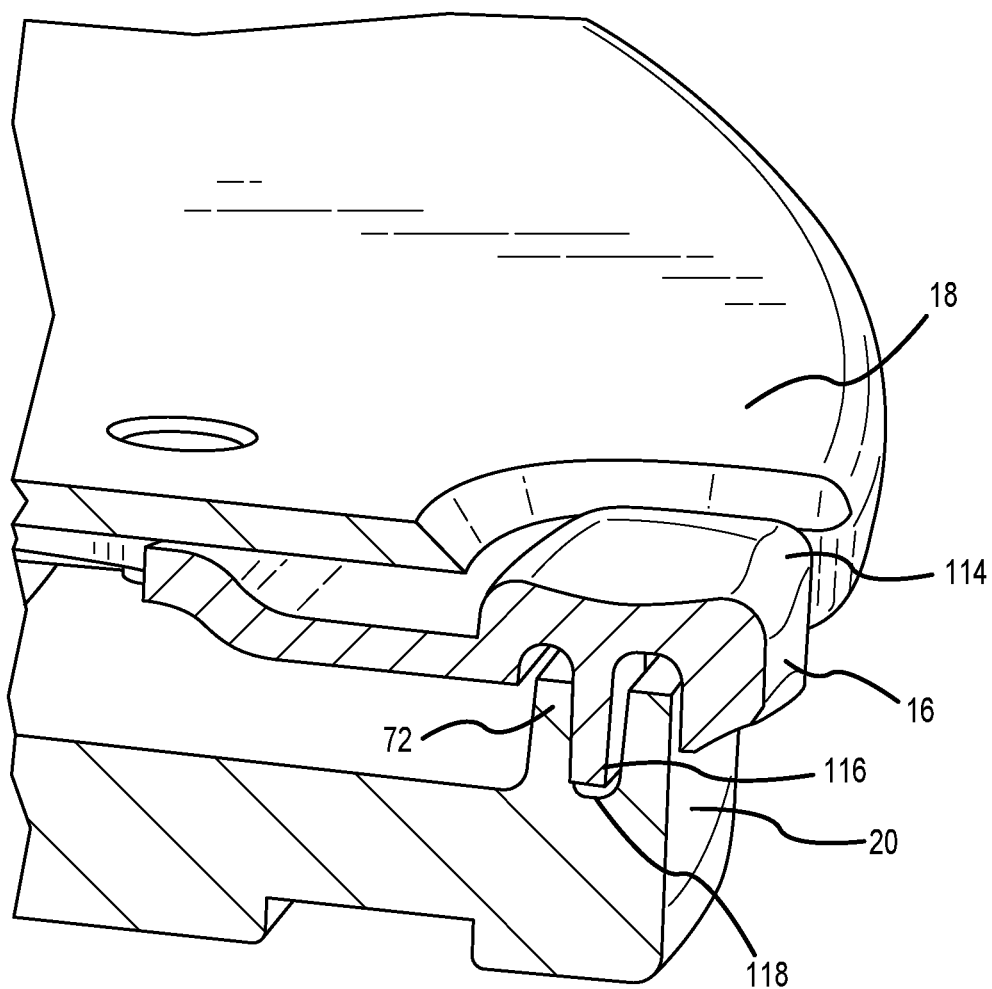
FIG. 17 is a cross-sectional view of the tool and the locking tab taken along line A in FIG. 16 in accordance with an embodiment of the present disclosure.

FIGS. 16 and 17 show the locking tab 16 engaged with the lock slot 34 of the upper plate 18. FIG. 16 is a top plan view of the locking tab 16 and tool with the upper plate shown in phantom, and FIG. 17 is a perspective, cross-sectional view of the locking tab 16 taken along line A in FIG. 16. The arms 110a, 110b of the locking tab 16 serve as the proximal end of the locking tab 16, and the arms 110a, 110b deflect into notches 120a, 120b of the lock slot 34. This allows the locking tab 16 to articulate about these notches 120a, 120b and rotate relative to the upper plate between an up and engaged position and a down and disengaged position.

FIG. 17 shows the locking tab 16 pushed downward into the engaged position where the locking protrusion 116 drives into the locking ridge 72 of the lower plate 20 with an interference fit to prevent the relative rotate of the plates 18, 20. This maintains the position of the holding arms and secures the workpiece. A user can lift the locking tab 16 to eliminate the interference fit as shown in FIG. 3 to allow the plates 18, 20 to rotate relative to each other. This allows the holding arms to move to, for example, release the workpiece from the tool.

Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

It is to be appreciated that any feature described herein can be claimed in combination with any other feature(s) as described herein, regardless of whether the features come from the same described embodiment.

What is claimed is:

1. A tool for a potter's wheel, the tool comprising:
   an upper plate having an arm slot configured to receive a holding arm, the arm slot oriented in a radial direction of the upper plate;
   a lower plate having a spiral ridge extending from an outer end to an inner end, wherein a distance between the spiral ridge and a center of the lower plate decreases from the outer end to the inner end, wherein the holding arm is configured to engage the spiral ridge, and wherein the upper plate is rotatable relative to the lower plate;
   wherein, in a first rotational position between the upper and lower plates, the spiral ridge is configured to set the holding arm at a first distance from a center of the upper plate;
   wherein, in a second rotational position between the upper and lower plates, the spiral ridge is configured to set the holding arm at a second distance from the center of the upper plate, wherein the first and second rotational positions are distinct and the first and second distances are distinct;
   a guide rail portion of the arm slot, wherein the guide rail portion defines a reduced width of the arm slot, and the guide rail portion is configured to retain at least one flange of the holding arm to keep the holding arm retained in the arm slot, wherein the at least one flange comprises:
      a first flange and a second flange laterally extending from one side of the holding arm, wherein the first flange and the second flange are offset in a longitudinal direction of the holding arm to reduce tilt of the holding arm in the arm slot; and
      a third flange and a fourth flange laterally extending from an opposing side of the holding arm, wherein the third flange and the fourth flange are offset in the longitudinal direction of the holding arm to reduce tilt of the holding arm in the arm slot; and
   an additional guide rail portion of the arm slot, wherein the guide rail and the additional guide rail define guide slots configured to receive the first flange, the second flange, the third flange, and the fourth flange.

2. The tool of claim 1, further comprising:
   a first guide protrusion and a second guide protrusion of the holding arm extending downwardly such that the first guide protrusion is positioned on one side of the spiral ridge, and the second guide protrusion is positioned on an opposing side of the spiral ridge, wherein engagement between the first and second guide protrusions and the spiral ridge translates rotational movement between the upper and lower plates to radial movement of the holding arm toward and away from the center of the upper plate.

3. The tool of claim 1, wherein the arm slot is one of a plurality of arm slots, each arm slot is oriented in the radial direction of the upper plate and configured to receive a respective holding arm, and arm slots of the plurality of arm slots are equally spaced with respect to each other about the center of the upper plate; and
   wherein the spiral ridge is one of a plurality of spiral ridges, each spiral ridge is associated with a respective arm slot of the plurality of arm slots to move the respective holding arm toward and away from the center of the upper plate at different rotational positions between the upper and lower plates.

4. The tool of claim 1, further comprising:
   a plurality of apertures in the lower plate configured to receive a plurality of fasteners of the potter's wheel, wherein each aperture of the plurality of apertures is configured to engage a respective fastener of the plurality of fasteners, each aperture having:
      a body portion at least partially extending along a circle defined by a radius;
      a receiving portion that tapers from the body portion to a point, wherein the point is positioned outside of the circle; and
      a securing portion positioned on an opposing side of the body portion from the receiving portion, wherein the securing portion tapers from the body portion to at least one lobe that defines a tab, wherein the tab is at least partially positioned inside of the circle, and the tab is configured to deflect against the respective fastener to drive the respective fastener toward the receiving portion to hold the respective fastener.

5. The tool of claim 1, further comprising:
   a lock positioned in a lock slot of the upper plate, wherein the lock is configured to deflect and engage a locking ridge of the lower plate with an interference fit to hold a rotational position between the upper and lower plates.

6. A tool for a potter's wheel, the tool comprising:
   a lower plate having an upper surface and a lower surface, wherein the lower plate is configured to engage a potter's wheel;
   a plurality of apertures extending between the upper and lower surfaces of the lower plate, wherein the plurality of apertures is configured to receive a plurality of fasteners of the potter's wheel, each aperture of the plurality of apertures is configured to engage a respective fastener of the plurality of fasteners, and each aperture has:
      a body portion at least partially extending along a circle defined by a radius;
      a receiving portion that tapers from the body portion to a point, wherein the point is positioned outside of the circle; and
      a securing portion positioned on an opposing side of the body portion from the receiving portion, wherein the securing portion tapers from the body portion to at least one lobe that defines a tab, wherein the tab is at least partially positioned inside of the circle, and the tab is configured to deflect against the respective fastener to drive the respective fastener toward the receiving portion to hold the respective fastener.

7. The tool of claim 6, further comprising:
   a plurality of relief apertures extending between the upper and lower surfaces of the lower plate, wherein each relief aperture of the plurality of relief apertures is positioned proximate to a securing portion of a respective aperture of the plurality of apertures to allow further deflection of the tab defined by the respective aperture.

8. The tool of claim 6, wherein apertures of the plurality of apertures are equally spaced with respect to each other about a center of the lower plate, and apertures of the plurality of apertures are an equal distance from the center of the lower plate.

9. The tool of claim 6, further comprising:
a plurality of second apertures extending between the upper and lower surfaces of the lower plate, wherein the plurality of second apertures is configured to receive a plurality of second fasteners of a second potter's wheel, each second aperture of the plurality of second apertures is configured to engage a respective second fastener of the plurality of second fasteners, and each second aperture has a body portion, a receiving portion, and a securing portion, wherein each second fastener is positioned a distance from a center of the lower plate that is distinct from a distance between each fastener of the plurality of fasteners and the center of the lower plate.

10. The tool of claim 6, further comprising:
a plurality of post holes extending between the upper and lower surfaces of the lower plate, wherein the plurality of post holes is configured to receive a plurality of third fasteners of a third potter's wheel, and each post hole is configured to engage a respective third fastener of the plurality of third fasteners.

11. The tool of claim 6, further comprising:
an upper plate having an arm slot configured to receive a holding arm, the arm slot oriented in a radial direction of the upper plate;
a spiral ridge on the upper surface of the lower plate extending from an outer end to an inner end, wherein a distance between the spiral ridge and a center of the lower plate decreases from the outer end to the inner end, wherein the holding arm is configured to engage the spiral ridge, and the upper plate is rotatable relative to the lower plate;
wherein, in a first rotational position between the upper and lower plates, the spiral ridge is configured to set the holding arm at a first distance from a center of the upper plate; and
wherein, in a second rotational position between the upper and lower plates, the spiral ridge is configured to set the holding arm at a second distance from the center of the upper plate, wherein the first and second rotational positions are distinct, and the first and second distances are distinct.

12. The tool of claim 11, further comprising:
a lock positioned in a lock slot of the upper plate, wherein the lock is configured to deflect and engage a locking ridge of the lower plate with an interference fit to hold a rotational position between the upper and lower plates.

13. The tool of claim 6, wherein the plurality of apertures are positioned about a center of the lower plate, and the receiving portions of the apertures of the plurality of apertures are oriented in the same rotational direction about the center of the lower plate.

14. The tool of claim 6, wherein the body portion of each aperture extends between the upper surface of the lower plate and the lower surface of the lower plate, wherein the receiving portion of each aperture extends between the upper surface of the lower plate and the lower surface of the lower plate, and wherein the securing portion of each aperture extends between the upper surface of the lower plate and the lower surface of the lower plate.

15. A tool for a potter's wheel, the tool comprising:
a lower plate configured to engage the potter's wheel, and the lower plate has a locking ridge extending upwardly from an upper surface of the lower plate;
an upper plate that is rotatable relative to the lower plate, wherein a holding arm is engaged with the upper plate, and relative rotation between the lower and upper plates is configured to move the holding arm away or toward a center of the upper plate to secure a workpiece;
a lock engaged with a lock slot in the upper plate such that the lock is rotatable relative to the upper plate;
wherein, in a down position relative to the upper plate, a downwardly-extending protrusion of the lock is engaged with the locking ridge of the lower plate in an interference fit to hold a rotational position between the upper and lower plates; and
wherein, in an up position relative to the upper plate, the protrusion of the lock is disengaged with the locking ridge of the lower plate to permit the relative rotation between the upper and lower plates.

16. The tool of claim 15, wherein two arms at a proximal end of the lock are configured to deflect into respective notches in the lock slot to allow the lock to rotate relative to the upper plate.

17. The tool of claim 15, further comprising:
a plurality of notched recesses in a lower surface of the lower plate, wherein the plurality of notched recess is configured to receive clay to bond the lower plate to the potter's wheel.

18. The tool of claim 15, further comprising:
a screw extending through a center aperture of the upper plate and a center aperture of the lower plate; and
a nut and a tension controller washer engaged with a distal end of the screw to secure the upper and lower plates together and allow relative rotation between the upper and lower plates.

19. The tool of claim 15, further comprising:
an arm slot of the upper plate configured to receive the holding arm, wherein the arm slot oriented in a radial direction of the upper plate;
a spiral ridge of the lower plate extending from an outer end to an inner end, wherein a distance between the spiral ridge and a center of the lower plate decreases from the outer end to the inner end, wherein the holding arm is configured to engage the spiral ridge;
wherein, in a first rotational position between the upper and lower plates, the spiral ridge is configured to set the holding arm at a first distance from the center of the upper plate; and
wherein, in a second rotational position between the upper and lower plates, the spiral ridge is configured to set the holding arm at a second distance from the center of the upper plate, wherein the first and second rotational positions are distinct, and the first and second distances are distinct.

20. The tool of claim 15, further comprising:
a plurality of apertures in the lower plate configured to receive a plurality of fasteners of the potter's wheel, wherein each aperture of the plurality of apertures is configured to engage a respective fastener of the plurality of fasteners, each aperture having:
a body portion at least partially extending along a circle defined by a radius;

a receiving portion that tapers from the body portion to a point, wherein the point is positioned outside of the circle; and a securing portion positioned on an opposing side of the body portion from the receiving portion, wherein the securing portion tapers from the body portion to at least one lobe that defines a tab, wherein the tab is at least partially positioned inside of the circle, and the tab is configured to deflect against the respective fastener to drive the respective fastener toward the receiving portion to hold the respective fastener.

* * * * *